United States Patent
Koo et al.

(10) Patent No.: US 9,418,304 B2
(45) Date of Patent: Aug. 16, 2016

(54) SYSTEM AND METHOD FOR RECOGNIZING TEXT INFORMATION IN OBJECT

(75) Inventors: Hyung-Il Koo, Seoul (KR); Kisun You, Suwon (KR); Hyun-Mook Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 13/367,764

(22) Filed: Feb. 7, 2012

(65) Prior Publication Data
US 2013/0004076 A1    Jan. 3, 2013

Related U.S. Application Data

(60) Provisional application No. 61/502,781, filed on Jun. 29, 2011.

(51) Int. Cl.
  G06K 9/22    (2006.01)
  G06K 9/62    (2006.01)
  G06K 9/32    (2006.01)

(52) U.S. Cl.
  CPC .......... *G06K 9/228* (2013.01); *G06K 9/325* (2013.01); *G06K 9/6292* (2013.01); *G06K 2209/01* (2013.01)

(58) Field of Classification Search
  None
  See application file for complete search history.

(56) References Cited

U.S. PATENT DOCUMENTS

| | | | |
|---|---|---|---|
| 7,826,665 B2 | 11/2010 | Bressan et al. | |
| 7,849,398 B2 | 12/2010 | Dabet et al. | |
| 7,911,655 B2 | 3/2011 | Hatzav et al. | |
| 8,289,403 B2* | 10/2012 | Dobashi | G06K 9/00463 348/208.4 |
| 8,805,125 B1* | 8/2014 | Kumar et al. | 382/309 |
| 8,831,329 B1* | 9/2014 | Kumar et al. | 382/139 |
| 2003/0178487 A1* | 9/2003 | Rogers | 235/454 |
| 2007/0175998 A1* | 8/2007 | Lev | 235/454 |
| 2009/0144056 A1 | 6/2009 | Aizenbud-Reshef et al. | |
| 2009/0185737 A1* | 7/2009 | Nepomniachtchi | 382/139 |
| 2010/0008535 A1 | 1/2010 | Abulafia et al. | |

(Continued)

FOREIGN PATENT DOCUMENTS

| | | | |
|---|---|---|---|
| CN | 101571875 A | 11/2009 | |
| CN | 101599124 A | 12/2009 | |

(Continued)

OTHER PUBLICATIONS idScan—"idScan User Manual—Powered by ScanShell"—version 9.24, pp. 1-53—Oct. 24, 2009.*

(Continued)

*Primary Examiner* — Bernard Krasnic
(74) *Attorney, Agent, or Firm* — Toler Law Group, PC

(57) ABSTRACT

A method for recognizing a text block in an object is disclosed. The text block includes a set of characters. A plurality of images of the object are captured and received. The object in the received images is then identified by extracting a pattern in one of the object images and comparing the extracted pattern with predetermined patterns. Further, a boundary of the object in each of the object images is detected and verified based on predetermined size information of the identified object. Text blocks in the object images are identified based on predetermined location information of the identified object. Interim sets of characters in the identified text blocks are generated based on format information of the identified object. Based on the interim sets of characters, a set of characters in the text block in the object is determined.

48 Claims, 23 Drawing Sheets

(56) References Cited

U.S. PATENT DOCUMENTS

| | | | |
|---|---|---|---|
| 2010/0231733 | A1 | 9/2010 | Dobashi et al. |
| 2010/0246961 | A1 | 9/2010 | Prasad et al. |
| 2010/0331043 | A1* | 12/2010 | Chapman et al. .......... 455/556.1 |
| 2011/0128360 | A1 | 6/2011 | Hatzav et al. |
| 2012/0087537 | A1* | 4/2012 | Liu et al. ...................... 382/100 |
| 2012/0113489 | A1* | 5/2012 | Heit et al. ..................... 358/518 |

FOREIGN PATENT DOCUMENTS

| | | |
|---|---|---|
| JP | S63177284 A | 7/1988 |
| JP | H02166579 A | 6/1990 |
| JP | H0743726 | 5/1995 |
| JP | 2000115522 A | 4/2000 |
| JP | 2008282094 A | 11/2008 |
| JP | 2010218061 A | 9/2010 |
| KR | 20100135050 A | 12/2010 |

OTHER PUBLICATIONS

Datta, K.—"Credit Card Processing Using Cell Phone Images"—pp. 1-7, Jan. 1, 2011.*

Odobez, J.M.—"Video Text Recognition using Sequential Monte Carlo and Error Voting Methods", pp. 1-22, 2005.*

Bhaskar, S. et al., "Implementing Optical Character Recognition on the Android Operating System for Business Cards", Project reports for EE 368 Digital Image Processing, Jun. 7, 2010, Retrieved from the Internet: URL: http://www.stanford.edu/class/ee368/Project_10/Reports/Bhaskar_Lavassar_Green_BusinessCardRecognition.pdf [retrieved on Jul. 30, 2012].

International Search Report and Written Opinion—PCT/US2012/040445—ISA/EPO—Aug. 21, 2012.

Neo et al., "Real-Time Online Multimedia Content Processing", Proceedings of the 1st International Convention on Rehabilitation Engineering & Assistive Technology in Conjunction with 1st Tan Tock Seng Hospital Neurorehabilitation Meeting, Jan. 1, 2007, pp. 201-206.

OCR: Choose the Best String Based on Last N Results (An Adaptive Filter for OCR), Stackoverflow—online programmer forum, Mar. 29, 2012, Retrieved from the Internet: URL: http://stackoverflow.com/questions/9930273/ocr-choose-the-best-string-based-on-last-n-results-an-adaptive-filter-for-ocr [retrieved on Jul. 27, 2012].

Written Opinion of the International Preliminary Examining Authority for PCT/US2012/040445 mailed Jul. 9, 2013, 6 pp.

Casey, et al., "Intelligent Forms Processing," IBM Systems Journal, vol. 29, Issue 3, 1990, pp. 435-450.

Cesarini, et al., "INFORMys: A Flexible Invoice-Like Form-Reader System," IEEE Transactions on Pattern Analysis Machine Intelligence, vol. 20, No. 7, Jul. 1998, pp. 730-745.

International Preliminary Report on Patentability for PCT/US2012/040445 mailed Oct. 21, 2013, 23 pp.

Lienhart, R., "Video OCR: A Survey and Practitioner's Guide," Video Mining, 2003, vol. 6, Springer US, New York, NY, pp. 155-183.

* cited by examiner

| Object type | Credit Card | Driver License | |
|---|---|---|---|
| Issuer name | ABC Bank | ABC State | ⋮ |
| Size information | 8.3:5.2 | 8.3:5.2 | ⋮ |
| Text block I | (1.2,4.4) (12,5.4) | (7,2.5) (9.5,3.3) | ⋮ |
| Character format | **** **** **** **** Number | ************ Number | ⋮ |
| Text block II | (5.3,5.9) (8,6.7) | (11.5,2.5) (13.4,3.3) | ⋮ |
| Character format | / Number | --** Number | ⋮ |
| Text block III | (1.2,6.9) (5.9,7.9) | (4.8,5.5) (8.4,6.3) | ⋮ |
| Character format | Alphanumeric | Alphanumeric | ⋮ |
| Text block IV | | (4.8,6.9) (11.3,8) | ⋮ |
| Character format | | N/A | ⋮ |

OBJECT DATABASE 140

FIG. 5

|  | 1800 | 1802 | 1804 | 1806 |  |  |
|---|---|---|---|---|---|---|
| 1810 | 1 | 2 | 3 | 4 | ... | ... |
| 1820 | 1 | 2 | 3 | 4 | ... | ... |
| 1830 | 1 | 2 | 3 | 4 | ... | ... |
| 1840 | 1 | 2 | 3 | 4 | ... | ... |
| 1850 | 4 | 6 | 8 | 7 | ... | ... |
| 1860 | 4 | 2 | 3 | 4 | ... | ... |
| 1870 | 4 | 3 | 3 | 4 | ... | ... |

FIG. 18

|      | 1900 | 1902 | 1904 | 1906 |
|------|------|------|------|------|
| 1910 | 1 2 3 4 | 5 6 7 8 | 9 8 7 6 | 5 4 3 2 |
| 1920 | 1 2 3 4 | 5 6 7 8 | 9 8 7 6 | 5 4 3 2 |
| 1930 | 1 2 3 4 | 5 6 7 8 | 9 8 7 6 | 5 4 3 2 |
| 1940 | 1 2 3 4 | 5 6 1 8 | 9 8 1 6 | 5 4 8 2 |
| 1950 | 4 2 3 4 | 5 8 7 8 | 9 8 7 6 | 5 4 3 2 |
| 1960 | 4 2 3 4 | 5 6 7 8 | 9 8 7 6 | 5 4 3 2 |
| 1970 | 4 2 3 4 | 5 6 7 8 | 9 8 7 8 | 5 1 3 2 |

FIG. 19

SYSTEM AND METHOD FOR RECOGNIZING TEXT INFORMATION IN OBJECT

CROSS-REFERENCE TO RELATED APPLICATIONS

This application is based upon and claims the benefit of priority from U.S. Provisional Patent Application No. 61/502,781, filed on Jun. 29, 2011, the entire contents of which are incorporated herein by reference.

TECHNICAL FIELD

The present disclosure relates generally to recognizing text information. More specifically, the present disclosure relates to a system and method for recognizing a text block in an object having a specified form.

BACKGROUND

Modern mobile devices have evolved to include image capturing capabilities through the use of cameras as well as high speed processors. Taking advantage of such features, some mobile devices have provided text recognition capability to recognize text from a captured image of a document. Users of such mobile devices have extended the use of such capabilities to objects beyond paper documents such as credit cards, ID cards, etc. to recognize text information in the objects.

Conventional text recognition methods in mobile devices have generally recognized text blocks in an object based on a single object image. For example, mobile devices with conventional text recognition capabilities typically allow a user to capture a single image of an object. Text blocks in the object image are then recognized by processing the object image.

However, such conventional text recognition methods based on a single object image often suffer from inaccuracies in recognizing the characters in the text blocks due to varying conditions under which the image may be captured. For example, an image of an object may be captured under less than optimum lighting conditions such as light reflection, poor lighting, etc., which may degrade the quality of the captured image. Further, in a mobile device setting, some portions of the image may be captured out of focus or may suffer from blurring due to unwanted motion of the mobile device in the user's control.

Thus, there is a need for a method and system that allow recognition of text blocks in objects more accurately in various conditions under which the object images are captured.

SUMMARY

The present disclosure provides systems and methods for recognizing a text block in an object using a temporal filtering.

According to one aspect of the present disclosure, a method for recognizing a text block in an object is disclosed. The text block has a set of characters. The method includes receiving a plurality of images of an object. Each image of the object includes the text block. The text blocks in the images of the object are identified. The set of characters is determined based on the identified text blocks in the plurality of images of the object. This disclosure also describes a device, an apparatus, a combination of means, and a computer-readable medium relating to this method.

BRIEF DESCRIPTION OF THE DRAWINGS

FIG. 5 is a diagram of an exemplary object database including identification and configuration information for various objects having text blocks according to one embodiment of the present disclosure.

FIG. 18 depicts a group of interim sets of characters on a character basis for use in inferring a set of characters in a text block in an object according to one embodiment of the present disclosure.

FIG. 19 depicts a group of interim sets of characters on a word basis for use in inferring a set of characters in a text block in an object according to another embodiment of the present disclosure.

DETAILED DESCRIPTION

Figure 1:
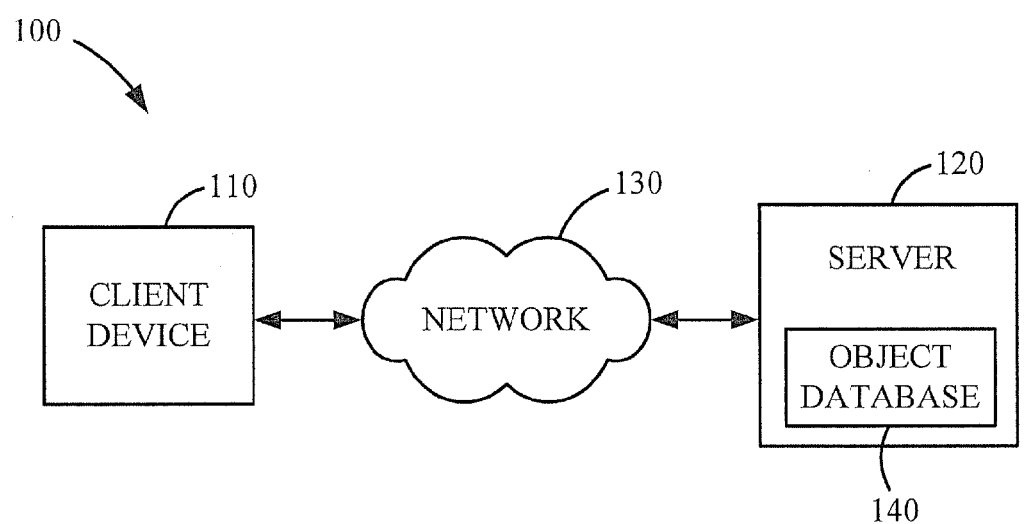
FIG. 1 illustrates a block diagram of a system for recognizing text blocks in an object from object images, including a client device and a server according to one embodiment of the present disclosure.

Various embodiments will now be described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates a block diagram of a system 100 for recognizing text blocks in an object from a plurality of images of the object according to one embodiment of the present disclosure. The system 100 includes a client device 110 and a server 120 in communication through a network 130. The client device 110 is configured to capture a plurality of images of an object having one or more specified text blocks of characters such as a credit card, a business card, a driver license, a passport, an identification document, etc., and recognize the text blocks in the object. In one embodiment, the client device 110 may identify the object based on a specified pattern in an object image and provides the server 120 with object identification information. The client device 110 may be any suitable computer or mobile device, such as a smartphone, a laptop, a tablet computer, or the like, equipped with an image capturing capability, e.g., a camera or a video camera, and communication capability through a communication network.

The server 120 receives the object identification information from the client device 110 and accesses an object database 140 based on the object identification information. The object database 140 provides information on a plurality of objects, including information on objects such as object identification and configuration information such as object layout and text block information. In the case of a credit card, for example, the object identification information may include information on the type of credit cards (e.g., Visa card or MasterCard), the name of an issuing bank, etc. The object configuration information includes information on the layout of an object including the size of the object, location and character format of text blocks, etc. The object database 140 may include additional information as will be described later with reference to FIG. 5. The server 120 provides the configuration information of the identified object to the client device 110.

The client device 110 may receive configuration information for the identified object including associated information on the object configuration and text blocks from the server 120 via the network 130. Based on the received configuration information, the client device 110 identifies and recognizes text blocks, and infers the characters in the text blocks.

Figure 2:
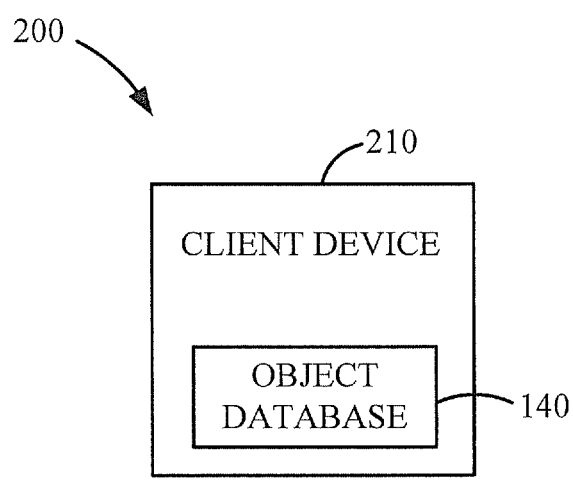
FIG. 2 illustrates a block diagram of a client device system for recognizing text blocks in an object from object images according to another embodiment of the present disclosure.

In another embodiment, the object database 140 may be provided in the client device 110 instead of the server 120. FIG. 2 illustrates a block diagram of a client device system 200 that includes the object database 140 for recognizing text blocks in an object from a plurality of images of the object according to another embodiment of the present disclosure. In this embodiment, the client device 210 operates in a similar manner as the client device 110. The client device 210 may identify an object based on a specified pattern in the object image. Further, from the object database 140 stored in the client device 210, the client device 210 retrieves configuration information for the identified object including information on the size of the object, the location and format of text blocks, etc.

The method and system of the present disclosure applies to any objects, which include text information. For example, the objects may be documentary objects in either electronic or paper format, or physical objects such as credit cards, business cards, driver licenses, identification documents, etc. In general, an object may have identification and may be associated with configuration information that distinguishes it from other objects.

Figure 3:
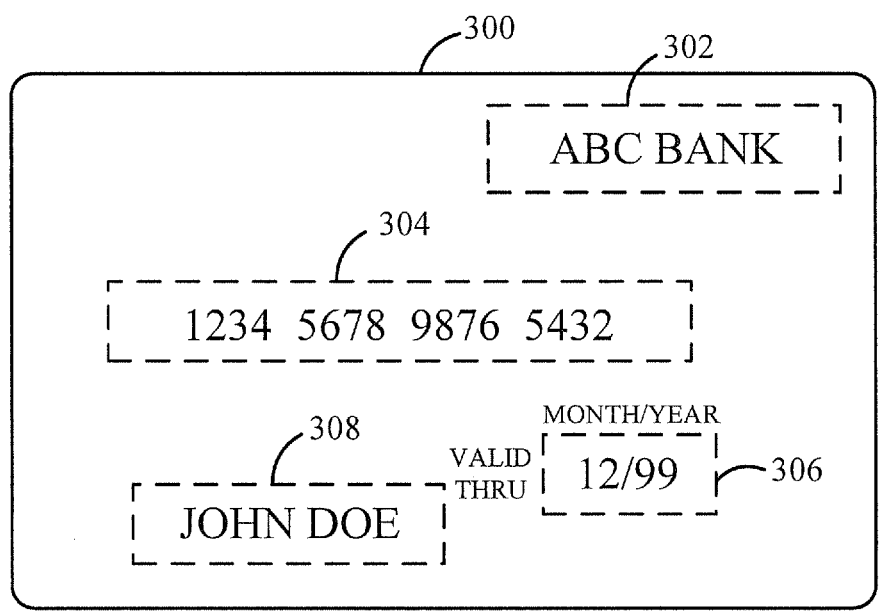
FIG. 3 depicts an image of an exemplary object in the form of a credit card including text blocks that can be recognized according to one embodiment of the present disclosure.

FIG. 3 illustrates an image of an exemplary object in the form of a credit card 300 that can be captured for recognizing text blocks 304, 306, and 308 according to one embodiment of the present disclosure. As shown, the credit card 300 includes a plurality of text blocks 304, 306, and 308 that include alphanumeric characters, which can be recognized. The text block 304 includes a unique card number while the text block 306 contains an expiration date consisting of month/year. Further, the text block 308 includes a cardholder name.

The credit card 300 also includes a block 302 having identification information of a card issuer. For example, the block 302 may contain text information and/or an image such as a pattern or logo of the card issuer (e.g., ABC bank) that can identify the object 300 as a credit card. The specific type of the credit card 300 may be determined by recognizing the identification information in the block 302 and/or other identification information or patterns provided in the card 300.

Generally, the layout and format of the credit card 300 are predetermined by the card issuer and are the same for credit cards of the same type from the same issuer. In particular, configuration information such as the size of the card 300 and the location, layout, and format of the blocks 302 to 308 are typically the same for cards of the same type. For example, the locations of the text blocks 304 to 308 may be defined by specified points such as a top left-hand corner point and a bottom right-hand corner point with respect to a reference location of the credit card 300. The configuration information and identification information for the credit card 300 are pre-stored in an object database 140, as will be described in more detail below with reference to FIG. 5.

Figure 4:
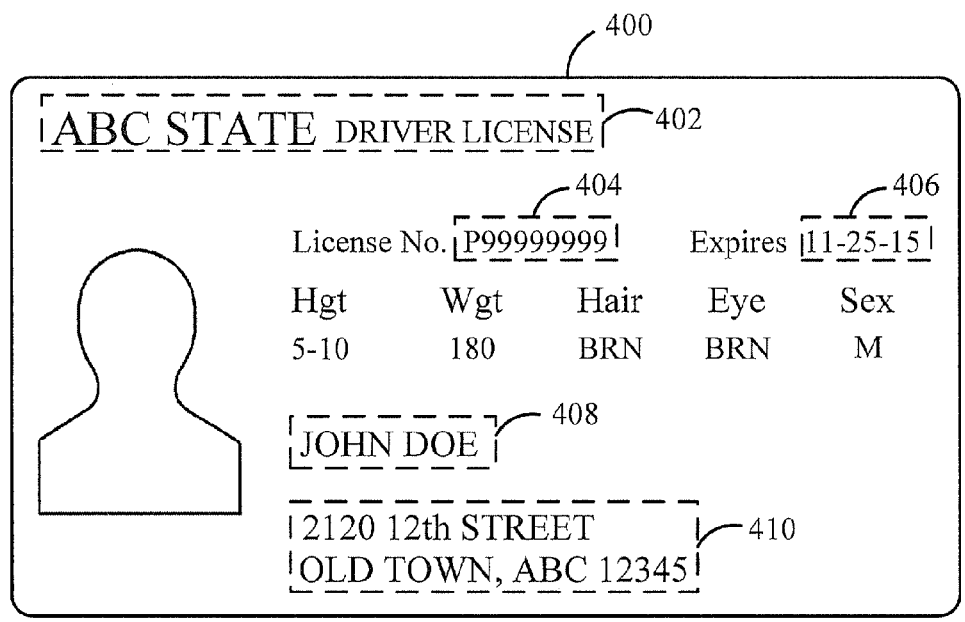
FIG. 4 depicts an image of an exemplary object in the form of a driver license including text blocks that can be recognized according to one embodiment of the present disclosure.

FIG. 4 depicts an image of another exemplary object in the form of a driver license 400 that can be captured for recognizing text blocks 404, 406, 408, and 410 according to one embodiment of the present disclosure. The driver license 400 includes a block 402, which provides identification information of the name of the card issuer. For example, the block 402 includes text information and/or an image such as a pattern or logo that can identify the object 400 as a driver license of a particular issuing authority (e.g., ABC state).

As shown, the driver license 400 also includes a plurality of text blocks 404 to 410. The text block 404 includes a license number while the text block 406 contains an expiration date consisting of month-day-year. Further, the text block 408 includes the name of the owner, and the text block 410 includes the address of the owner.

Typically, configuration information such as the layout and format of the driver license 400 is predetermined by a card issuer and is the same for other license cards of the same type from the same issuer. Such configuration information is stored in an object database 140 with the identification information, as will be described later in more detail. In some embodiments, the client device 110 (or client device 210) retrieves such configuration information from the object database 140 to recognize the text blocks based on the configuration information.

FIG. 5 illustrates an exemplary object database 140 including identification and configuration information for a plurality of objects having one or more text blocks according to one embodiment of the present disclosure. The object database 140 may be generated and stored in the server 120 and/or client device 210. For each object, the database 140 includes the identification information and configuration information of the object.

As shown in FIG. 5, the object database 140 includes identification and configuration information of the credit card 300 in FIG. 3, the driver license 400 in FIG. 4, etc. The identification information for each object includes an object type and a name of the object issuer or source. In the case of the credit card 300, for example, the issuer's name "ABC Bank" is stored along with the object type "Credit Card" in the object database 140. Similarly, an object type "Driver License" and the issuer name "ABC State" are stored in the object database 140 to identify the object. In addition, the database 140 may also store other types of identification information for each object such as a logo or pattern.

The object database 140 also contains configuration information for each of the objects including the size of the object and the location, layout, and format of each text block that can be recognized. The size information may provide an aspect ratio of the object such as the credit card 300 and the driver license 400. The size information may be provided to the client device 110, which can verify whether a detected boundary of an object in the image is correct in comparison to the size information from the database 140. Text blocks I, II, and III of the credit card 300 include location information of text blocks 304, 306, and 308 in FIG. 3, respectively, while the text blocks I, II, III, and IV of the driver license 400 contain location information of text blocks 404, 406, 408, and 410 in FIG. 4, respectively. In this arrangement, each of the text blocks I, II, III, and IV provides two coordinates with a specified unit (e.g., pixel in an object image) to indicate the locations of an upper-left vertex and a lower-right vertex of the respective blocks with respect to a reference location of the object. In this case, the location of each text block may be identified by using the two coordinates with respect to a reference location at the top left-hand corner of the object, since each text block is configured as a rectangle. For example, from the two coordinates (1.2, 4.4) and (12, 5.4) of the text block I of the credit card 300, the location of the text block I of the credit card 300 can be defined by coordinates of four vertices (1.2, 4.4), (12, 4.4), (1.2, 5.4), and (12, 5.4). Thus, the width and the height of the text block I are determined to be 10.8 (=12−1.2) and 1 (=5.4−4.4), respectively. Such location information of the text blocks may be provided to the client device 110 such that the geometric locations of the text blocks can be identified in the object such as the credit card 300, the driver license 400, etc.

The object database 140 also includes a character format of each of the text blocks I, II, III, and IV such as the number of characters within each text block, an arrangement of characters, and/or a type of character. For example, the character format of the text block I of credit card 300 provides a character format "**   ," which indicate the number and arrangement of characters in the text, block 304, and "Number," which indicates that the characters in the text block are numbers. The character format of the text blocks may be provided to the client device 110** for use in recognizing characters in the text blocks. In some embodiments, the configuration information may also include the shape of the object, color/font of the text characters, language of the characters, etc.

Figure 6:
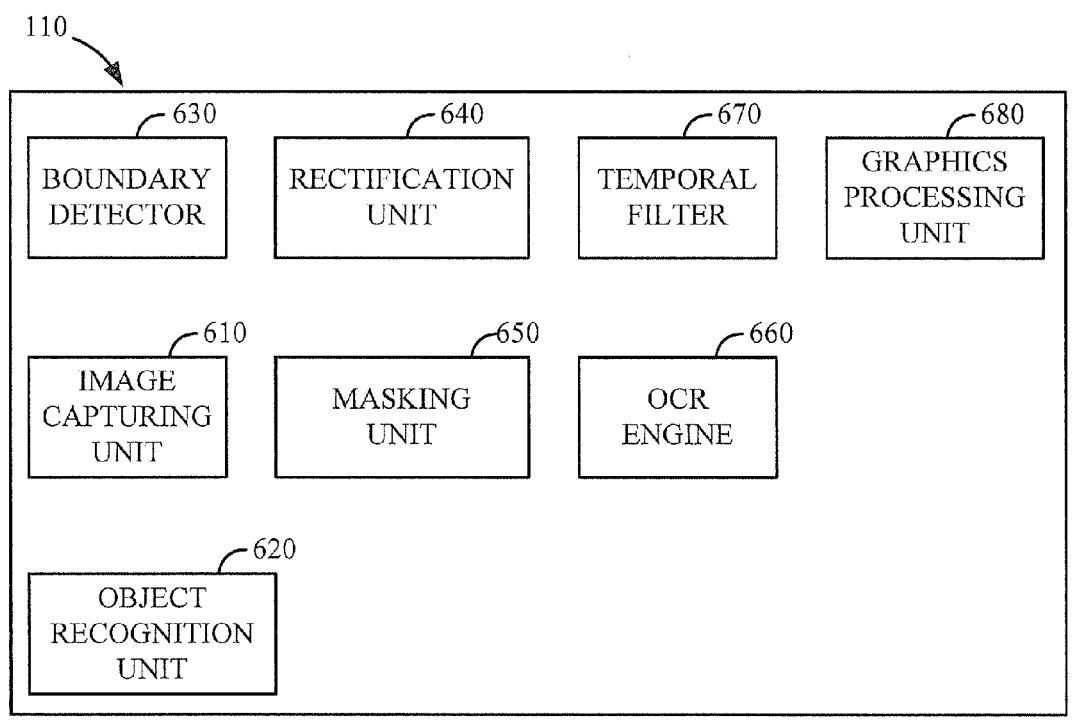
FIG. 6 illustrates a detailed block diagram of the client device for recognizing text blocks from object images according to one embodiment of the present disclosure.

FIG. 6 illustrates a detailed block diagram of the client device 110 in FIG. 1 according to one embodiment of the present disclosure. The client device 110 includes an image capturing unit 610, an object recognition unit 620, a boundary detector 630, a rectification unit 640, a masking unit 650, an OCR engine 660, a temporal filter 670, and a graphics processing unit 680. The image capturing unit 610 includes an image sensor (e.g., a video camera or a digital camera) to capture a plurality of images of an object (e.g., a sequence of images) having a specified configuration or layout. The image capturing unit 610 provides an image of the object to the object recognition unit 620 for identifying the object. From the object image, the object recognition unit 620 extracts a pattern, and compares the pattern with predetermined patterns of various known objects provided by the server 120 or the client device 110. When the pattern is found to match the pattern of a known object, the object is identified to be the known object. Alternatively, the object recognition unit 620 may receive identification of the object from a user input through a user interface (not shown) provided by the client device 110. As will be described in more detail below, the object identification information is provided to the server 120 to retrieve object configuration information from the object database 140.

The image capturing unit 610 provides the images of the object to the boundary detector 630 for detecting a boundary of the identified object in the images. The boundary detector 630 also receives configuration information (e.g., an object size or aspect ratio) for the object from the server 120. For each image, the boundary detector 630 identifies a boundary of the object in the image that defines the object region by determining boundary features of the object region such as corners and edges, based on the received configuration information. Based on the identified boundary, the boundary detector 630 extracts an image of the object region from each of the images and provides the images of the object regions to a rectification unit 640.

Since an image of an object region from the captured object images may not accurately reflect the size, shape, and/or orientation of the object, each object region image is rectified in the rectification unit 640. The rectification unit 640 is configured to receive configuration information such as size information (e.g., an aspect ratio, a length, and a width) of the object from the server 120, and rectify the images of object regions based on the size information of the object. For example, the object regions in the images may be transformed to match the aspect ratio of the object. The images of the rectified object regions may be provided to the masking unit 650.

From the extracted and rectified object regions, text blocks are identified by masking their locations. The masking unit 650 receives configuration information of the text blocks in the object from the server 120 such as locations and sizes of text blocks, etc. Based on the configuration information of the text blocks, the masking unit 650 identifies the text blocks in the object region in each of the images. In some embodiments, the masking unit 650 uses information on locations of the text blocks in the object region to identify a geometric location of each text block within the object region. By identifying the geometric locations of the text blocks, the masking unit 650 can avoid reading or processing unnecessary information from other regions in the object image.

For each of the identified text blocks in an object region, the OCR engine 660 recognizes the characters in the text blocks. The OCR engine 660 is configured to receive the identified text blocks in each of the images from the masking unit 650 and the object configuration information including character formats of the text blocks from the server 120. Based on the object configuration information, the OCR engine 660 recognizes the characters in each of the text blocks to generate an interim set of characters for each text block. The interim sets of characters of a text block from the images are then used by the temporal filter 670 to determine a final set of characters for the text block. The character format information may include the number of characters in each of the text blocks, an arrangement of the characters, a text color/font of the characters, the language type of the characters, etc. In this configuration, the interim sets of characters may be recognized using a holistic method or a segmentation-based method, which will be described in detail later.

The temporal filter 670 determines a final set of characters for each of the text blocks in an object based on interim sets of characters from a plurality of images of the object captured over a period time. Initially, the temporal filter 670 receives the interim sets of characters corresponding to each text block in the object images from the OCR engine 660. The temporal filter 670 determines a final set of characters by inferring a set of characters from interim sets of characters for each of the text blocks of the object. In determining the final set of characters, the characters may be inferred on a character-by-character basis or word-by-word basis based on the number of occurrences for each character or each word in the interim sets of characters. Thus, each character or each word in the text blocks may be inferred from the interim sets of characters when the number of occurrences for a character or a word exceeds a predetermined threshold.

In one embodiment, the set of characters is inferred based on confidence levels of the interim sets of characters reflecting the sharpness of the characters in the text blocks. When the OCR engine 660 generates an interim set of characters, it compares similarity values between reference characters or words stored in the OCR engine 660 and each character or word in a text block in an object image. Based on the similarity values, characters or words having the greatest similarity value are identified as characters or words in the interim set of characters. In this case, the similarity value of a character or word may be used as a confidence level in determining a final set of characters in the text block.

In addition, the temporal filter 670 may provide the character recognition result to the graphics processing unit 680 to be displayed simultaneously as the text recognition is being performed. The client device 110 may include a display for displaying the recognition result of at least one text block in the object. Alternatively, the display may be installed in another device separate from the client device 110, and connected to the client device 110 via a network. The display may be any suitable electronic visual display including LCD (Liquid Crystal Display), PDP (Plasma Display Panel), or LED (Light Emitting Diode), etc. to output an object image and/or a recognition result for text blocks in the object.

Although FIG. 6 describes the client device 110 in FIG. 1 that communicates with the server 120, the configuration and operation of the client device 110 in FIG. 6 may be applied to the client device 210 having the object database 140 in the system 200 in FIG. 2.

Figure 7:
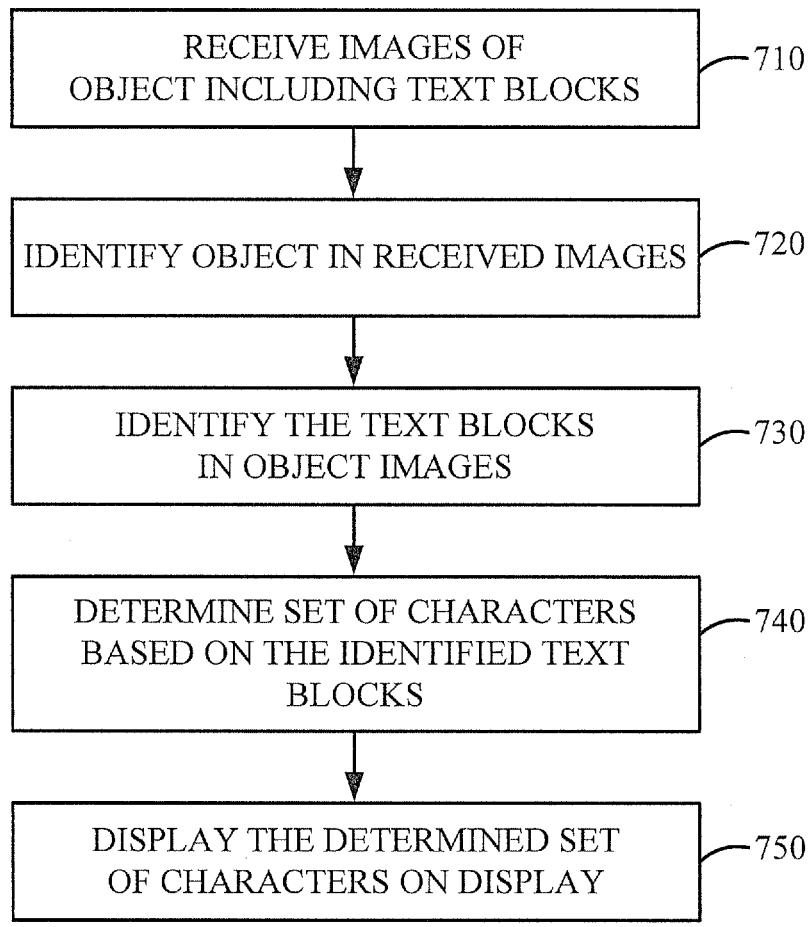
FIG. 7 is a flowchart of a method for recognizing a text block in an object according to one embodiment of the present disclosure.

FIG. 7 is a flowchart of a method for recognizing a text block in an object according to one embodiment of the present disclosure. At 710, the image capturing unit 610 captures and receives a plurality of images of an object including one or more text blocks. The images of an object may be a sequence of images (e.g., video frames of the object) captured over a period time. The captured images are provided to the object recognition unit 620, which is configured to identify the object in the received images, at 720. Once the object has been identified, the object recognition unit 620 provides identification information of the object to the server 120, which sends configuration information of the identified object to the client device 110. At 730, text blocks in each of the images of the object are identified by determining the locations of the text blocks based on the configuration information such as location information of the text blocks. Before identifying the text blocks in the object, a boundary of the object in each image may be detected and verified by the boundary detector 630 based on the size information such as an aspect ratio of the object, etc., as will be described in detail with reference to FIG. 10.

At 740, a set of characters for each text block in an object image is determined based on the identified text blocks in object images. Specifically, each of the identified text blocks is recognized by the OCR engine 660 to generate an interim set of characters, which is provided to the temporal filter 670 to determine a final set of characters for each text block. The graphics processing unit 680 receives the final set of characters for output to a display, on which the final set of characters are displayed, at 750.

Figure 8:
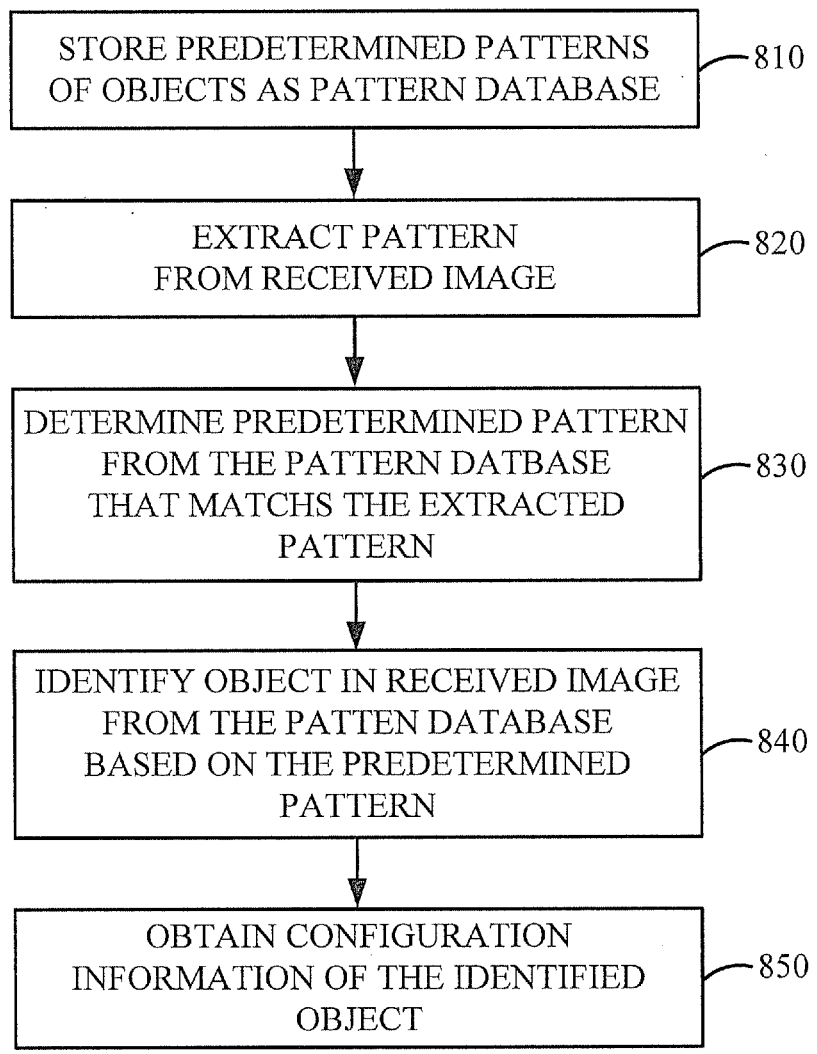
FIG. 8 illustrates a flowchart of a method for identifying an object from an image of an object based on predetermined patterns of objects according to one embodiment of the present disclosure.

FIG. 8 illustrates a more detailed flow chart of 720 in FIG. 7 for identifying an object of the received images according to one embodiment of the present disclosure. At 810, a database of predetermined patterns identifying a plurality of objects is stored in the client device 110 and is accessible to the object recognition unit 620. At 820, the object recognition unit 620 receives a captured image from the image capturing unit 610 and extracts a pattern from the image that can identify the object. In general, a pattern such as a logo and/or a set of feature points is predetermined by the source of the object (e.g., credit card issuing bank) and is provided on objects of the same type. Thus, the predetermined pattern of an object is generally different from those of other objects of a different type.

In some embodiments, a predetermined pattern may be extracted from a portion of a reference object that is unique to the type of the object when the database is built. Specifically, the portion of the reference object may be located in an inverse mask region, which refers to a region in the reference object where text blocks are not located. In this manner, predetermined patterns can be extracted from inverse mask regions of objects to build the database associated with a plurality of reference objects.

During identification of an object, any region of the object may be extracted as a portion of a pattern. When patterns in a mask region including a text block are extracted from an object image, they do not need to be considered in identifying the object since predetermined patterns are extracted from inverse mask regions of the object where text blocks are not located. That is, such a mask region can be assumed not to contain any pattern useful for identifying the object. Thus, the accuracy in identifying an object can be improved while reducing the processing time.

Given the extracted pattern, the object recognition unit 620 identifies, at 830, a predetermined pattern from the pattern database that matches the extracted pattern. Specifically, the predetermined pattern is determined by comparing the extracted pattern with the predetermined patterns in the database. At 840, the object recognition unit 620 identifies the object in the received image from the pattern database based on the matching predetermined pattern. Information on the identified object is then provided to the server 120, which sends configuration information of the identified object to the client device 110, at 850.

Figure 9:
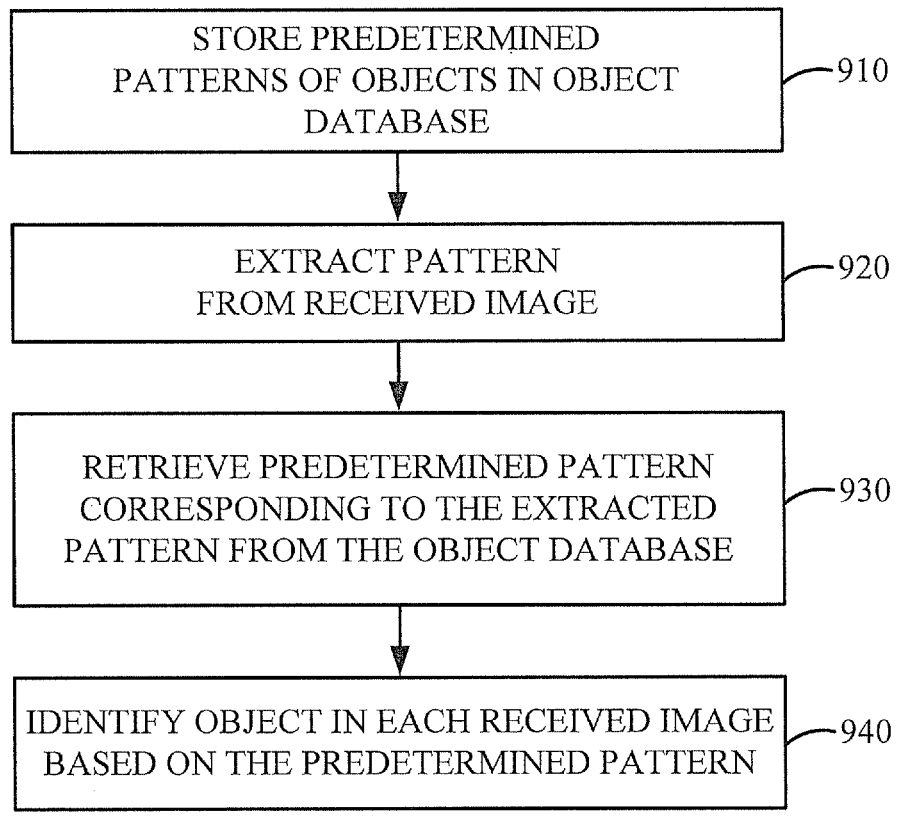
FIG. 9 illustrates a flowchart of a method for identifying an object from an image of an object based on an object database according to another embodiment of the present disclosure.

In another embodiment, the pattern database may be provided in the object database 140. FIG. 9 illustrates a more detailed flowchart of 720 in FIG. 7 for identifying an object of the received images by accessing the object database 140 according to another embodiment of the present disclosure. At 910, predetermined patterns are stored in the object database 140, which can be stored in the client device 110 or the server 120. At 920, a pattern in an image of an object is extracted from a portion of the object (e.g., the inverse mask region) by the object recognition unit 620 in a similar manner to the step of 820 in FIG. 8. In this case, the object recognition unit 620 obtains a predetermined pattern corresponding to the extracted pattern from the object database 140, at 930.

Based on the predetermined pattern, the object recognition unit 620 identifies an object in the received image, at 940. Information on the identified object is then provided to the server 120, which sends configuration information of the identified object to the client device 110. The client device 110 then obtains configuration information of the identified object from the object database 140, which is stored in the client device 110. Alternatively, in the case that the object database 140 is stored in the server 120, the object recognition unit 620 provides the identified object to the server 120 and receives configuration information related to the identified object from the server 120. Although FIGS. 8 and 9 describe identifying an object from a single image, the object recognition unit 620 may also be configured to identify the object from a plurality of the received images.

Alternatively, an object may be identified based on a user input. In this case, the object recognition unit 620 identifies the object according to a user input through a user interface (not shown) provided in the client device 110. In one embodiment, the object recognition unit 620 may provide a list of available objects such that a user can select one of the objects through the user interface. Accordingly, the object recognition unit 620 may identify the object in the received images accurately without the processing required for extracting a pattern from a received image.

Figure 10:
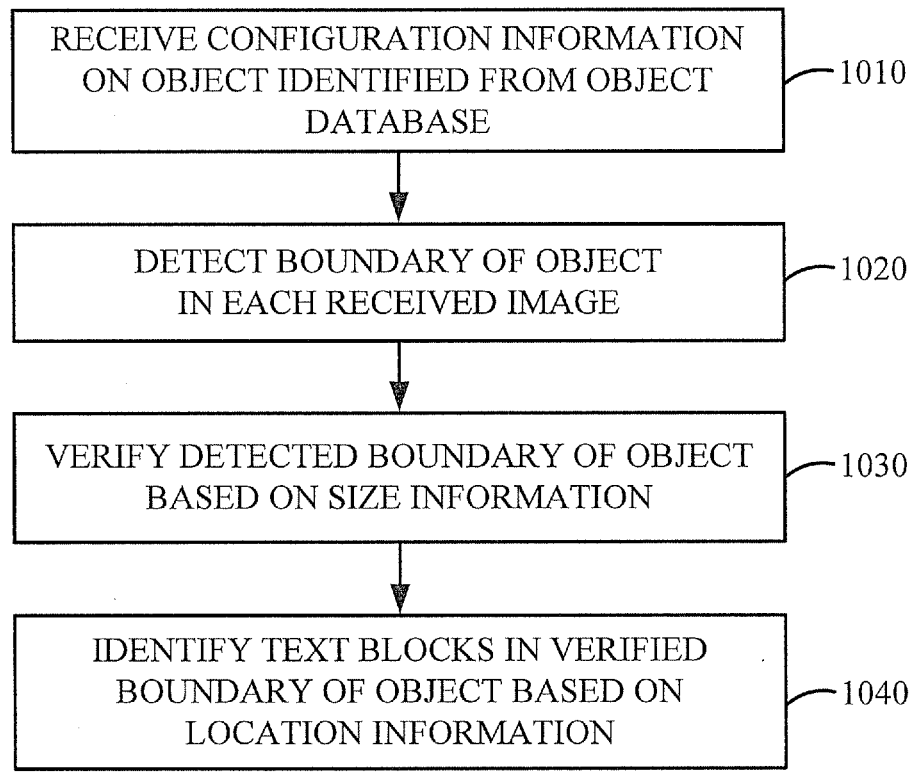
FIG. 10 illustrates a flowchart of a method for detecting a boundary of an object and identifying text blocks in the images of the object according to one embodiment of the present disclosure.

Once an object of the received images has been identified, the images can be processed to identify text blocks. FIG. 10 illustrates a more detailed flow chart of 730 for identifying text blocks in the object according to one embodiment of the present disclosure. At 1010, the client device 110 receives configuration information on the object identified from the object database 140. The configuration information includes size information of the object (e.g., aspect ratio, actual size, etc.), location information of text blocks in the object, character format of the text blocks, etc. In the case where the object database 140 is stored in the server 120, the received configuration information may be stored in a memory (not shown) in the client device 110 for use in identifying and recognizing the text blocks in the object. For example, the boundary detector 630, the rectification unit 640, the masking unit 650, and the OCR engine 660 may access the configuration from the memory in the client device 110.

At 1020, the boundary detector 630 detects a boundary of the object in each image by determining boundary features of the object region such as corners and edges. At 1030, the detected boundary of the object in each image may be verified to determine whether the boundary has been correctly identified based on the boundary features, a focal length used in capturing the images, and the aspect ratio of the object. Each of the object images within the identified boundary of the object may be provided to the masking unit 650 for identifying text blocks in the object images. The masking unit 650 receives the location information of the text blocks in the object and identifies each text block in each received image of the object, at 1040. In some embodiments, before identifying the text blocks, the rectification unit 640 may rectify the object region in each image to match the aspect ratio of the object received as part of the configuration information.

Figure 11:
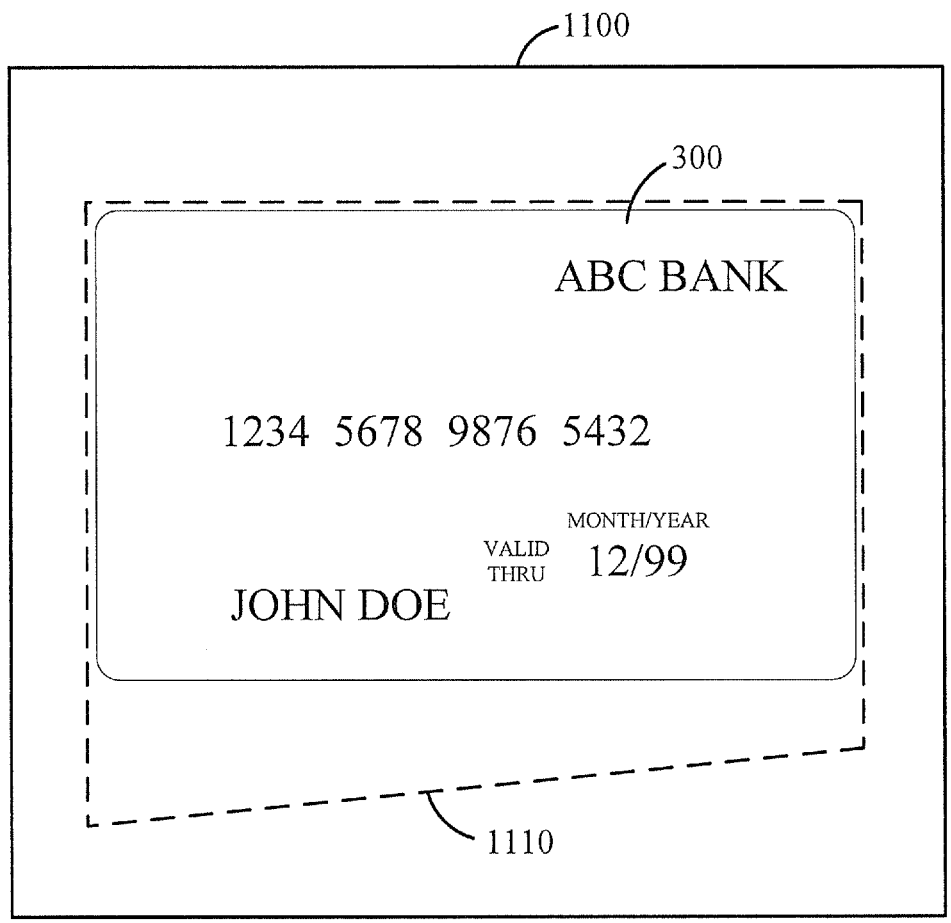
FIGS. 11 and 12 show detected boundaries of an object according to some embodiments of the present disclosure.
Figure 12:
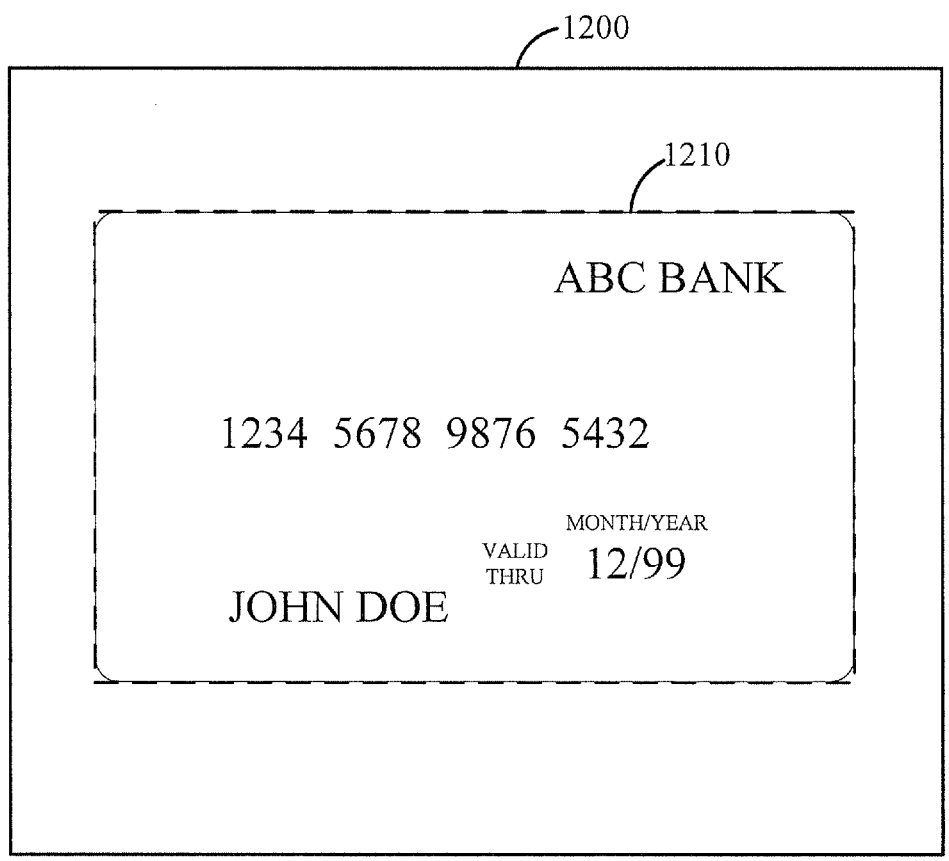

FIGS. 11 and 12 show object boundaries 1110 and 1210 detected from object images 1100 and 1200, respectively, of the credit card 300 according to one embodiment. In FIG. 11, the detected boundary 1110 of the credit card 300 does not match the boundary of the object 300 and is thus inaccurately identified. In this case, the boundary detector 630 may discard the detected boundary and detect a boundary of the credit card 300 from another object image of the credit card 300. Thus, if a boundary from one image of the credit card 300 has been inaccurately identified, a boundary may be detected from another image. Such boundary detection may be repeated until an accurate boundary is detected. FIG. 12 shows a case of accurate boundary detection where the detected boundary 1210 of the credit card 300 matches the actual boundary of the object 300.

Figure 13:
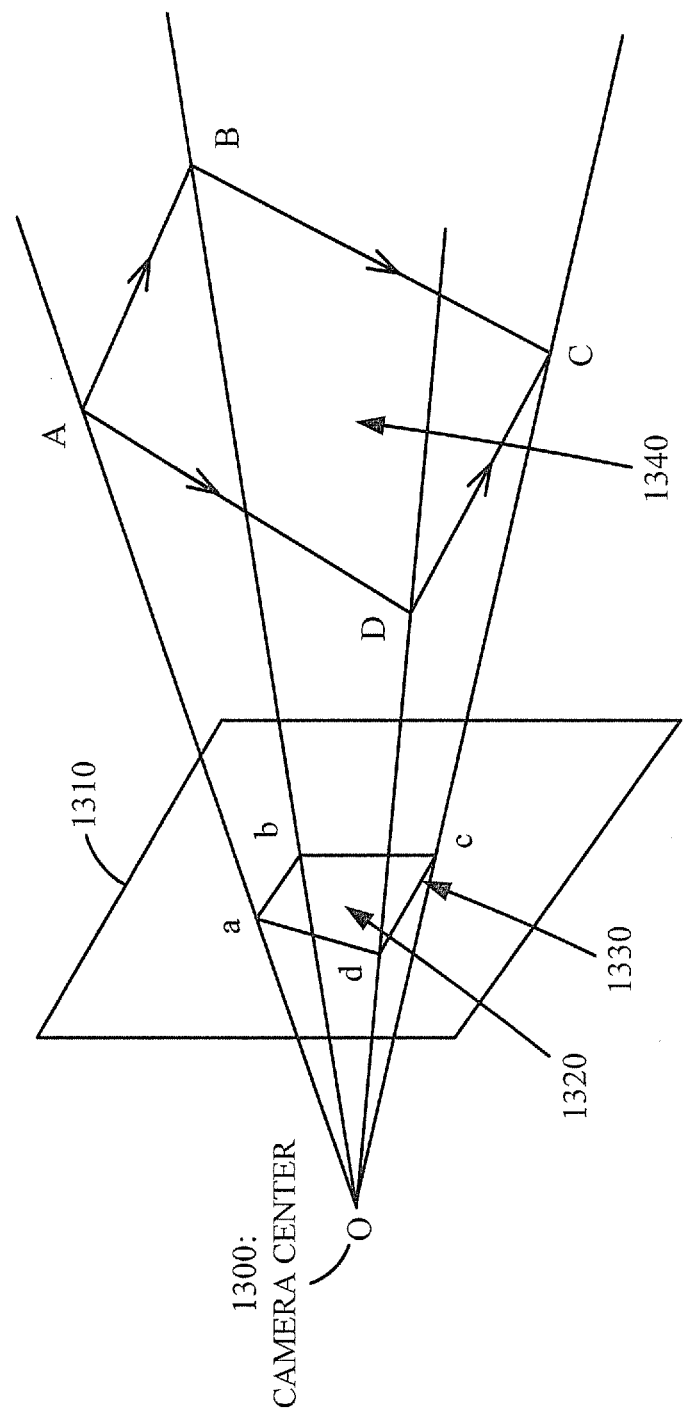
FIG. 13 is a diagram showing a relationship between a detected boundary of an object and an actual boundary of the object according to one embodiment of the present disclosure.

FIG. 13 is a diagram showing a relationship between a detected boundary 1330 of an object region 1320 having four points a, b, c, and d in a received image 1310 and an actual boundary of a rectangular object 1340 having four points A, B, C, and D according to one embodiment of the present. The object region 1320 is shown with a perspective distortion, which may be caused from a non-parallel alignment of the camera with respect to the object in capturing an image. As shown, the points a, b, c, and d correspond to four corner points of the detected boundary 1330 of the object region 1320. From a reference origin 1300 of the camera (e.g., camera center), lines are projected to points A, B, C, and D through points a, b, c, and d, respectively. In this case, the points A, B, C, and D define four corner points of a rectangle 1340 of the object. With a focal length f of the camera and coordinates $(x_1, y_1)$, $(x_2, y_2)$, $(x_3, y_3)$ and $(x_4, y_4)$ of the four corner points a, b, c, and d at the detected boundary 1330 of the object region 1320, the coordinates of the four corner points a, b, c, and d may be expressed in three-dimensional coordinates, as follows:

$$O_a = (x_1, y_1, f) \quad [1]$$

$$O_b = (x_2, y_2, f) \quad [2]$$

$$O_c = (x_3, y_3, f) \quad [3]$$

$$O_d = (x_4, y_4, f) \quad [4]$$

As shown, vectors $\vec{AB}$ and $\vec{AD}$ of the rectangle 1340 may be calculated based on a geometrical relationship among the reference origin 1300 of the camera, the detected boundary 1330 consisting of the corner points a, b, c, and d, and the rectangle 1340 consisting of the corner points A, B, C, and D, as follows:

$$\vec{AB} = (O_a \times O_b) \times (O_d \times O_c) \quad [5]$$

$$\vec{AD} = (O_b \times O_c) \times (O_a \times O_d) \quad [6]$$

Further, an equation of a line passing through the points A and B in the rectangle 1340 may be expressed with a parameter $t_1$ as follows:

$$\begin{pmatrix} X_1(t_1) \\ Y_1(t_1) \\ Z_1(t_1) \end{pmatrix} = A + t_1 \vec{h} \quad [7]$$

$$\vec{h} = \frac{\overrightarrow{AB}}{|\overrightarrow{AB}|} \quad [8]$$

where coordinates of point A may be set to $O_a$, which is equal to the coordinates of point a, without substantial discrepancy because an aspect ratio of a rectangle consisting of the points A, B, C, D rather than the actual size thereof will be computed. Further, a vector $\vec{h}$ may be calculated according to the equations [5] and [8]. Similarly, an equation of a line AD in the rectangle 1340 with a parameter $t_2$ may be expressed as follows:

$$\begin{pmatrix} X_2(t_2) \\ Y_2(t_2) \\ Z_2(t_2) \end{pmatrix} = A + t_2 \vec{v} \quad [9]$$

$$\vec{v} = \frac{\overrightarrow{AB}}{|\overrightarrow{AB}|} \quad [10]$$

where the coordinates of point A may also be set to $O_a$, as described above, and a vector $\vec{v}$ may be calculated according to the equations [6] and [10].

Two-dimensional coordinates of points b and d may be expressed in terms of coordinates of equations [7] and [9] consisting of parameters $t_1$ and $t_2$ respectively, as follows:

$$\left( f \frac{X_1(t_1)}{Z_1(t_1)}, f \frac{Y_1(t_1)}{Z_1(t_1)} \right) = (x_2, y_2) \quad [11]$$

$$\left( f \frac{X_2(t_2)}{Z_2(t_2)}, f \frac{Y_2(t_2)}{Z_2(t_2)} \right) = (x_4, y_4) \quad [12]$$

According to the above equations [9] to [12], the unknown quantities $t_1$ and $t_2$ can be determined, and the coordinates of B and D may be obtained. With the calculated coordinates of A, B, and D, an aspect ratio of $$\frac{AB}{AD}$$

may be calculated. Thus, if a difference between the calculated aspect ratio and the actual aspect ratio received from the object database 140 is within a threshold, the boundary detector 630 may verify the detected boundary to be correct.

After a boundary has been detected and verified, the boundary detector 630 may extract an image of the object lying within the detected boundary of the object image. Such an image corresponds to an object region of the object image. In some embodiments, the extracted image may be provided to the rectification unit 640, which rectifies the object region. For example, the rectification unit 640 may receive configuration information such as an aspect ratio of the object from the server 120 and rectify the object region by transforming the object region to match the aspect ratio of the object.

Figure 14:
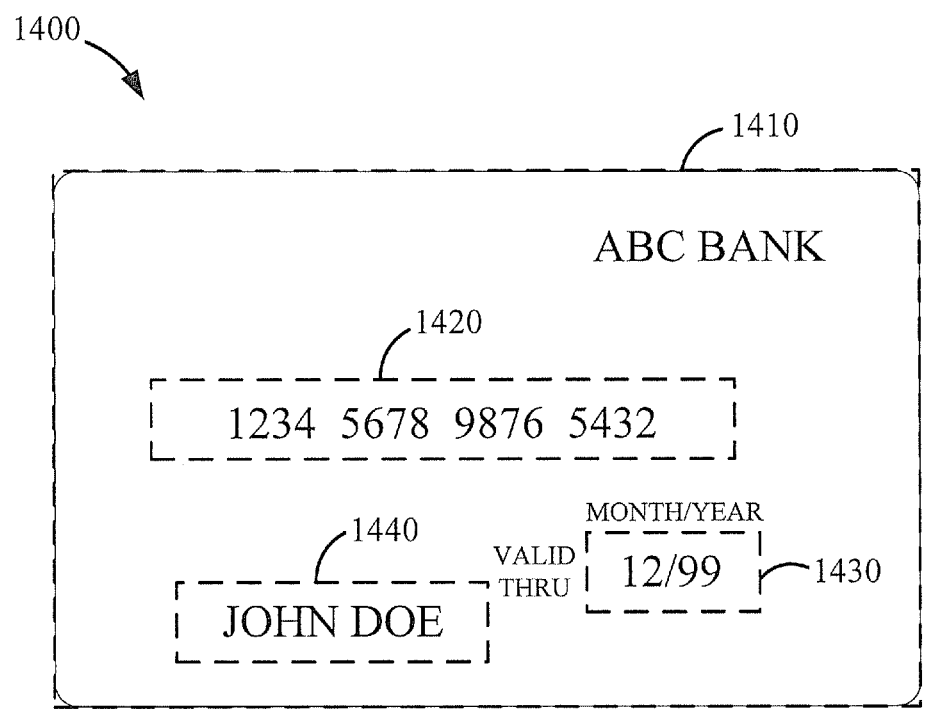
FIG. 14 illustrates identified text blocks of an object according to one embodiment of the present disclosure.

After an object region in each image of the object has been rectified, the rectified image is processed to identify one or more text blocks in the rectified image. FIG. 14 depicts an image 1400 of the credit card 300 within a verified boundary 1410 having identifiable text blocks 1420, 1430, 1440 according to one embodiment of the present disclosure. In this case, the masking unit 650 receives location information of the text blocks 1420, 1430, and 1440 in the credit card image 1400. For example, the location information may include geometric locations and sizes of the text blocks 1420, 1430, and 1440. Based on the location information, the masking unit 650 then identifies the text blocks 1420, 1430, and 1440 in the image 1400 of the credit card 300 that may be recognized. Such image 1400 of the credit card 300 with the identified text blocks 1420, 1430, and 1440 may be provided to the OCR engine 660 for character recognition of the text blocks 1420, 1430, and 1440.

Figure 15:
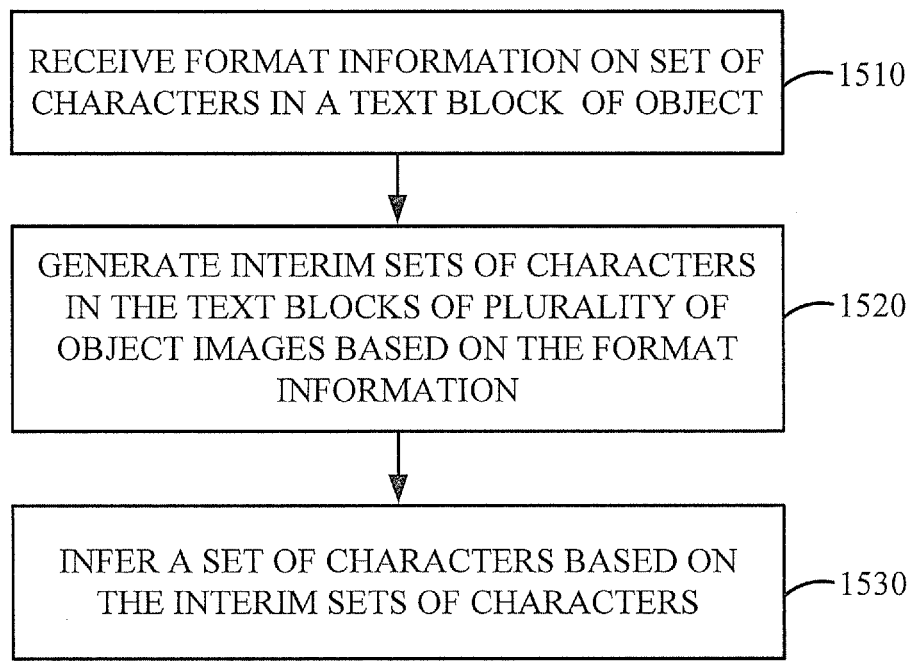
FIG. 15 illustrates a flowchart of a method for inferring a set of characters in a text block in an object based on interim sets of characters according to one embodiment of the present disclosure.

FIG. 15 illustrates a more detailed flowchart of 740 in FIG. 7 for determining a set of characters in a text block in an object based on interim sets of characters of corresponding text blocks in a plurality of images of the object according to one embodiment. The OCR engine 660 initially receives a plurality of images of an object, each having an identified text block, from the masking unit 650. Further, the OCR engine 660 receives format information on a set of characters in a text block of the object from the client device 110 or the server 120, at 1510. For example, the format information includes the character format of the text blocks such as the number, arrangement, type of characters, language of characters, etc. in the text block.

The OCR engine 660 recognizes each of the text blocks in the object images to generate interim sets of characters based on the format information, at 1520. In one embodiment, the interim sets of characters are generated based on a holistic method, which refers to recognizing each word in a text block in an object as a whole. In another embodiment, the interim sets of characters are generated based on a segmentation-based method, which segments each word in a text block to individual characters and then recognizes each character in the word. Both holistic method and segmentation-based method may generate the interim sets of characters in the text blocks in the object images based on the received format information. At 1530, the temporal filter 670 receives the interim sets of characters for the text blocks from the OCR engine 660 and then infers a set of characters for the text block in the object based on the received interim sets of characters, as will be described in detail with reference to FIGS. 16 to 19.

Figure 16:
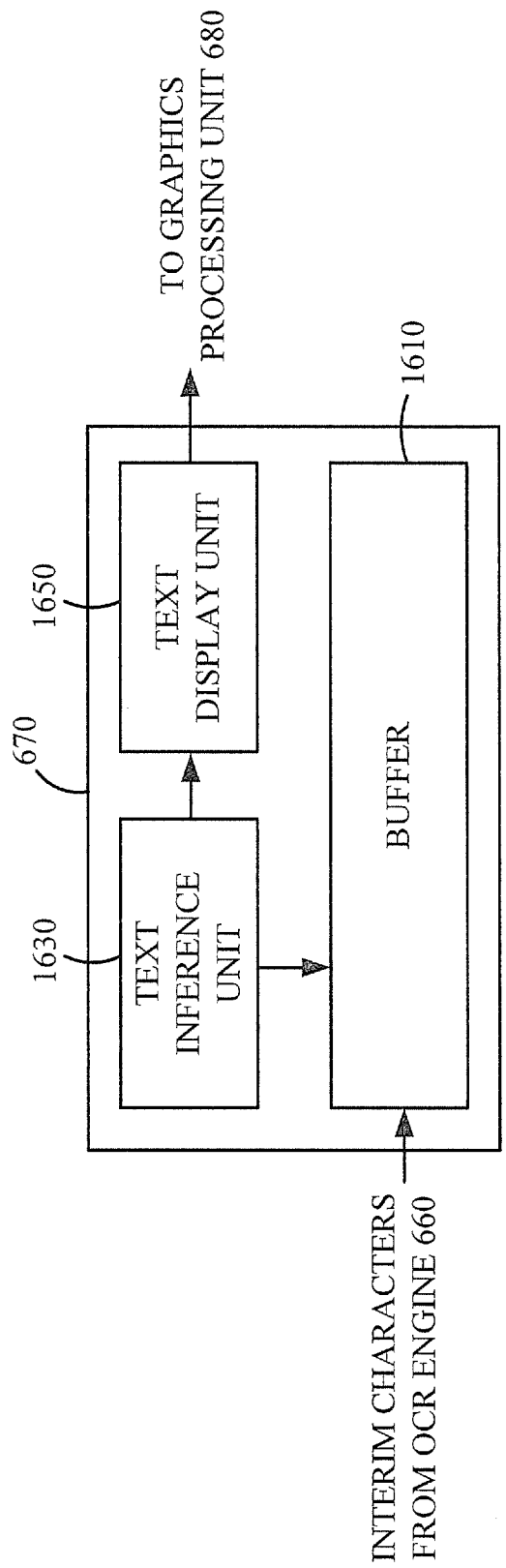
FIG. 16 illustrates a block diagram of a temporal filter for determining a set of characters in a text block in an object according to one embodiment of the present disclosure.

FIG. 16 illustrates a block diagram of the temporal filter 670 for determining a set of characters in a text block of an object based on interims sets of characters generated from text blocks in a plurality of images of the object according to one embodiment of the present disclosure. The temporal filter 670 includes a buffer 1610, a text inference unit 1630, and a text display unit 1650. The buffer 1610 stores interim sets of characters generated from the text blocks in the plurality of object images that are received from the OCR engine 660. Based on the interim sets of characters, the text inference unit 1630 determines a set of characters for the text block in the object. The text display unit 1650 receives the sets of characters in the text blocks recognized by the text inference unit 1630, which are provided to the graphics processing unit 680, for displaying the sets of characters for the text blocks in the object on a display. Although the temporal filter 670 determines a set of characters for a text block, the object may include a plurality of text blocks, for each of which a set of characters may be determined from corresponding interim sets of characters. That is, the temporal filter 670 may determine a set of characters for each text block in the object from interim sets of characters corresponding to the text block in the object images.

In some embodiments, the number of sample images of an object may be increased to enhance accuracy in recognition of the text blocks. In this case, the text inference unit 1630 may send a request to the image capturing unit 610 to capture additional images of the object such that additional interim sets of characters for the text block in the object can be generated from the OCR engine 660. This process may continue until a desired accuracy in the text blocks has been achieved.

The text inference unit 1630 may infer a set of characters in a text block on a character or word basis based on the number of occurrences for each character or word in interim sets of characters stored in the buffer 1610. In addition, a confidence level of each of the interim sets of characters, such as the sharpness of the characters in the text block or similarity values of identified characters or words in the interim set of characters, may be considered for inferring the set of characters.

Figure 17:
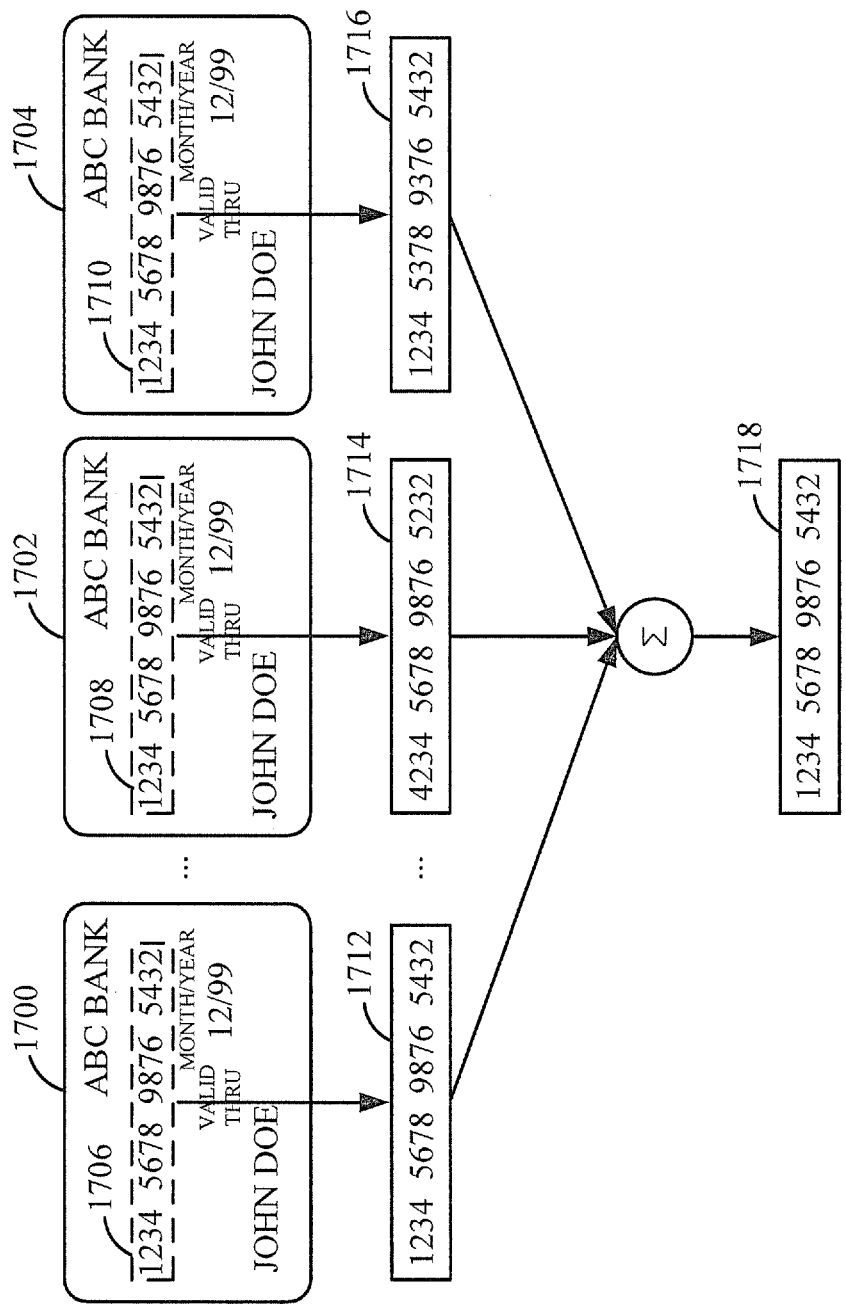
FIG. 17 illustrates a diagram of inferring a set of characters in a text block in an object based on interim sets of characters according to one embodiment of the present disclosure.

FIG. 17 depicts a diagram of inferring a set of characters 1718 in the exemplary text block 304 in the credit card 300 from a plurality of object images 1700, 1702, and 1704 captured over a period of time according to one embodiment of the present disclosure. Initially, the OCR engine 660 receives the plurality of credit card images 1700, 1702, and 1704 either sequentially or in parallel. For each of the object images 1700, 1702, and 1704, the OCR engine 660 generates an interim set of characters 1712, 1714, and 1716 for the text blocks 1706, 1708, and 1710, respectively. In this process, the interim sets of characters 1712, 1714, and 1716 are generated using character format information such as the number of characters in the text block 304, the arrangement of characters in the text block 304, and the type of characters in the text block 304, as shown in FIG. 5.

In some embodiments, the interim sets of characters 1712, 1714, and 1716 are generated based on a holistic method or a segmentation-based method, as mentioned above. Under the holistic method, for example, a plurality of words such as "1234," "5678," "9876," and "5432" in the text block 1706 are recognized on a word basis and combined to form the interim set of characters 1712. Alternatively, in the segmentation-based method, each interim sets of characters 1712, 1714, or 1716 is generated by segmenting the characters in the text block 1706, 1708, or 1710, respectively, to individual characters (e.g., 1, 2, 3, etc.) and recognizing each character individually.

The plurality of interim sets of characters 1712, 1714, and 1716 are then used to infer the final set of characters 1718 for the text block 304 in the temporal filter 670. The temporal filter 670 receives the interim sets of characters 1712, 1714, and 1716 from the OCR engine 660 and a confidence level of each of the interim sets of characters 1712, 1714, and 1716. The final set of characters 1718 for the text block 304 is then inferred on a character basis or a word basis based on the interim sets of characters 1712, 1714, and 1716. In the character-based method, for example, a first character (e.g., digit) of the final set of characters 1718 may be inferred based on the first characters "1," "4," and "1" in the interim sets of characters 1712, 1714, and 1716, respectively. Other characters in the final set of characters 1718 may be determined in a similar manner based on the characters in the corresponding positions in the interim sets of characters 1712, 1714, and 1716. In the word-based method, a first word of the final set of characters 1718 for the text block 304 is inferred based on the first words "1234," "4234," "1234" in the interim sets of characters 1712, 1714, and 1716. In a similar manner, other words in the final set of characters 1718 are inferred from words in the corresponding positions in the interim sets of characters 1712, 1714, and 1716. In some embodiments, the final set of characters 1718 may be inferred based on the number of occurrences of characters or words in the interim sets of characters 1712, 1714, and 1716 and/or confidence levels of interim sets of characters 1712, 1714, and 1716, as will be described in more detail below. Although three interim sets of characters 1712, 1714, and 1716 are illustrated to infer the final set of characters 1718, more or less than three interim sets of characters may be used to determine a set of characters in a text block in an object.

FIG. 18 illustrates a plurality of interim sets of characters 1810, 1820, 1830, 1840, 1850, 1860, and 1870 for use in inferring characters in the final set of characters for the text block 304 in the credit card 300 on a character-by-character basis according to one embodiment of the present disclosure. As shown, the characters in the interim sets 1810 to 1870 are grouped into a plurality of groups 1800, 1802, 1804, and 1806 according to their positions in the text block 304. For example, the group 1800 consists of first characters in the interim sets of characters 1810 to 1870. Similarly, the groups 1802, 1804, and 1806 include the second, third, and fourth characters in the interim sets 1810 to 1870, respectively.

Based on the grouping of characters in the same positions, a character for a text block in an object is inferred from the number of occurrences of characters in each position in interim sets of characters in the text blocks of a plurality of images of the object. In the first character group 1800, for example, the text inference unit 1630 infers that the first character for the text block 304 is "1," since the occurrence of "1" is greater than that of any other characters in the first character position in the interim characters 1810 to 1870.

To ensure further accuracy, the text inference unit 1630 may be configured to infer a character only when the number of occurrences of a character at a position exceeds a predetermined threshold value (e.g., 3). In the case of the first character group 1800, the occurrence of character "1" is four and thus, character "1" is determined to be the first character in the text block 304. In the case where a predetermined threshold has not been exceeded, the text inference unit 1630 may be configured to send a request to the image capturing unit 610 to capture additional images of the credit card 300. Once new interim sets of characters are generated based on the additional object images, the text inference unit 1630 infers the characters for the final set of characters for the text block 304 based on recent interim sets of characters including the new interim sets of characters.

In some embodiments, a character in a set of characters for a text block in an object is inferred based on a confidence level of an interim character as well as the number of occurrences in the corresponding position in interim sets of characters in text blocks from a plurality of images of the object. In the first character group 1800, for example, an average (e.g., 90) of confidence levels of first characters "4," "4," and "4" may be higher than that (e.g., 60) of first characters "1," "1," "1," and "1." In this case, the text inference unit 1630 may infer that the first character is "4" since the average of the confidence level times the number of occurrences of the first characters "4" is higher than that of the first characters "1" (i.e., 90*3=270>60*4=240). Thus, the inferring process for the first character of the text block 304 may be applied to each of the other characters in the text block 304. In addition, characters in other text blocks 306 and 308 in the credit card 300 may be inferred from interim sets of characters recognized from a plurality of object images in a similar manner.

FIG. 19 illustrates a plurality of interim sets of characters 1910, 1920, 1930, 1940, 1950, 1960, and 1970 for use in inferring words in the final set of characters for the text block 304 in the credit card 300 on word-by word basis according to another embodiment of the present disclosure. As shown, the words in the interim sets 1910 to 1970 are grouped into a plurality of groups 1900, 1902, 1904, and 1906 according to their positions in the text block 304. For example, the group 1900 consists of first words in the interim sets of characters 1910 to 1970. Similarly, the groups 1902, 1904, and 1906 may include the second, third, and fourth words in the interim sets 1910 to 1970, respectively.

Based on the grouping of words in the same positions, a word for a text block in an object is inferred from the number of occurrences of words in each position in interim sets of characters in the text blocks of a plurality of images of the object. In the first word group 1900, for example, the text inference unit 1630 infers that the first word for the text block 304 is "1234", since the occurrence of "1234" is greater than that of any other words in the first character position in the interim words 1910 to 1970. In this case, if a predetermined threshold value for the number of occurrences has not been exceeded, the text inference unit 1630 may be configured to send a request to the image capturing unit 610 to capture additional images of the credit card 300. In this case, new interim sets of characters are generated from the additional object images, and are utilized to infer the words for the final set of characters for text block 304.

In some embodiments, a word in a set of characters for a text block in an object is also inferred based on a confidence level of an interim set of characters. In the first word group 1900, for example, it may be determined that the average of the confidence levels of "4234" is higher than that of "1234." In some cases, even though the number of occurrences of "1234" is higher than that of the first word "4234," the text inference unit 1630 may infer that the first word in the set of characters is "4234" since the average of the confidence levels of "4234" are higher than those of "1234." Thus, the inferring process for the first word of the text block 304 may be applied to each of the other words in the text block 304. In addition, words in other text blocks 306 and 308 in the credit card 300 may be inferred from interim sets of characters recognized from a plurality of object images in a similar manner.

Figure 20:
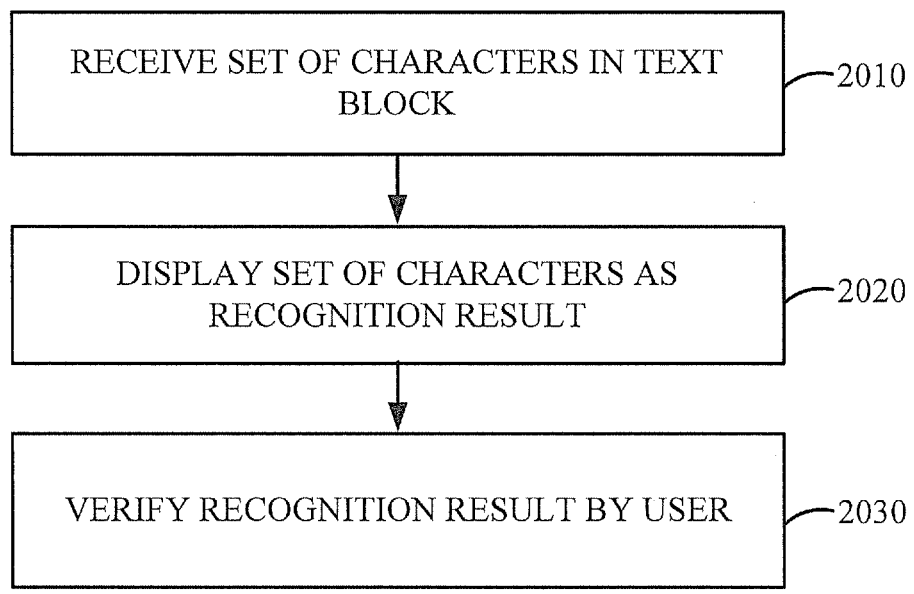
FIG. 20 is a flowchart of a method for verifying a recognition result by a user according to one embodiment of the present disclosure.

Once a final set of characters in each text block in an object is inferred, the set of characters can be displayed on a display as a recognition result, which may be verified by a user. FIG. 20 is a more detailed flowchart of 750 in FIG. 7 for verifying a displayed recognition result on a display by a user according to one embodiment of the present disclosure. At 2010, the graphics processing unit 680 receives a final set of characters in a text block from the text display unit 1650 in the temporal filter 670. At 2020, the graphics processing unit 680 sends the final set of characters to the display, which displays the characters as a recognition result. In one embodiment, whenever a character or a word in the final set of characters for each text block is determined by the text inference unit 1630, the determined character or word is provided to the display to display the determined character or word via the graphics processing unit 680. Further, the text inference unit 1630 may update the characters or words for each text block in the object by performing a new inference for the set of characters based on an interim set of characters generated using a newly captured image of the object, and provide the updated recognition information for display. Such updating process may be performed until all the characters in the set of characters for each text block in the object are recognized and displayed on the display. At 2030, the recognition result displayed on the display is then verified by a user. If the recognition result is not verified by the user, additional images of the object may be captured for text block recognition until the user finally verifies the result.

Figure 21:
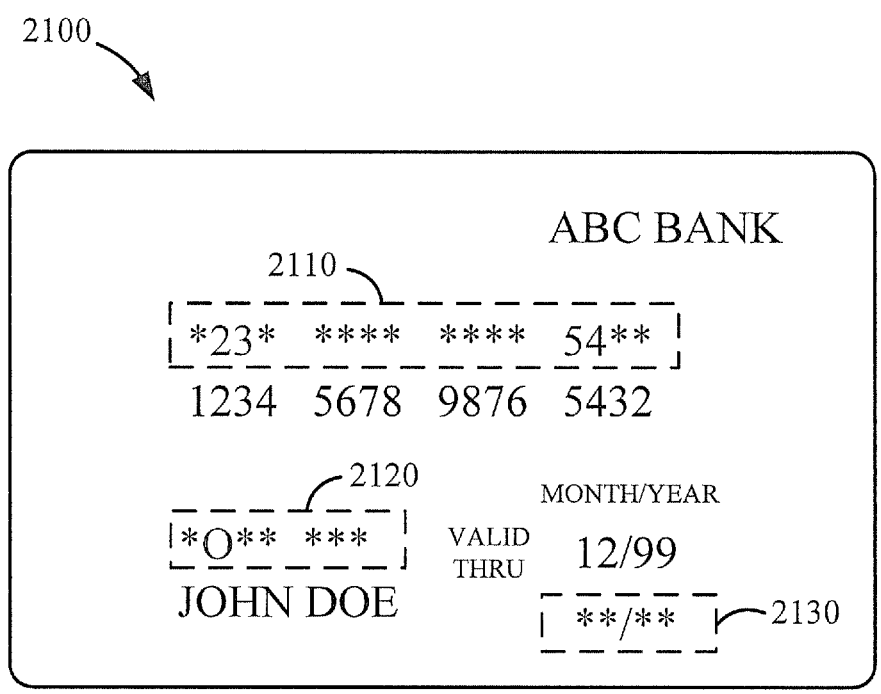
FIG. 21 illustrates a diagram displaying an intermediate recognition result on a display according to one embodiment of the present disclosure.

FIG. 21 illustrates a diagram 2100 displaying an intermediate recognition result for the credit card 300 on the display according to one embodiment of the present disclosure. As shown, a plurality of blocks 2110, 2120, and 2130 contains intermediate recognition results for the text blocks 304, 306, and 308, respectively. In this case, the intermediate recognition results include one or more non-recognized characters, each of which is shown as an asterisk (i.e., "*") indicating either that the character is in the process of being recognized or a failure in inferring the character. As the characters for the non-recognized characters are recognized and displayed, the asterisks may be changed to the recognized characters. In this manner, the interim recognition result may be displayed and updated until all characters in the text blocks 304, 306, and 308 are recognized.

Figure 22:
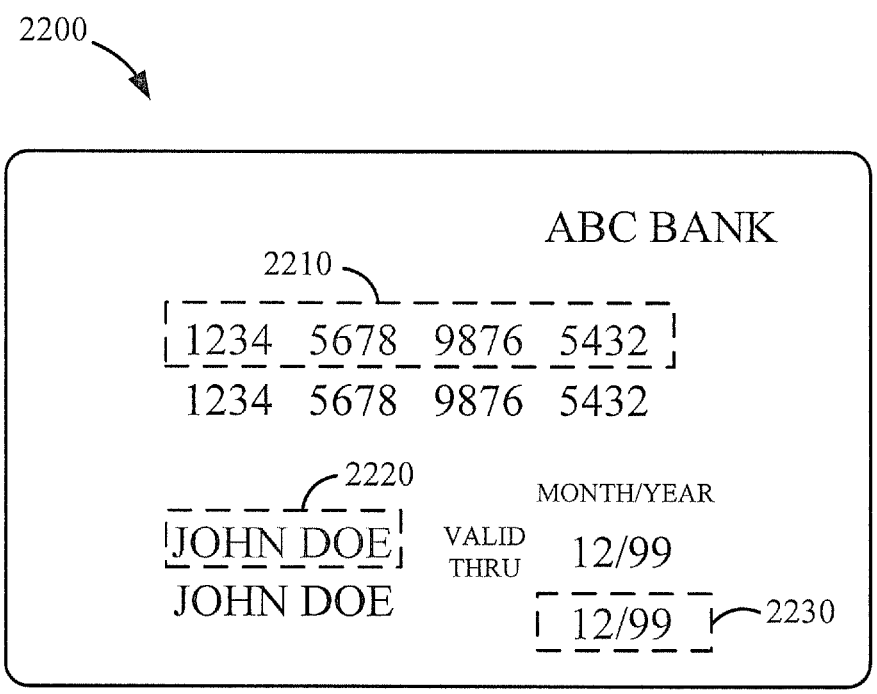
FIG. 22 illustrates a diagram displaying a final recognition result on a display according to one embodiment of the present disclosure.

FIG. 22 illustrates a diagram 2200 displaying a final recognition result for the credit card 300 on a display according to one embodiment. A plurality of blocks 2210, 2220, and 2230 contain characters in the text blocks 304, 306, and 308 that have all been recognized. In this case, the user may verify whether the final recognition result is correct in comparison to the actual characters in the text blocks 304, 306, and 308.

Figure 23:
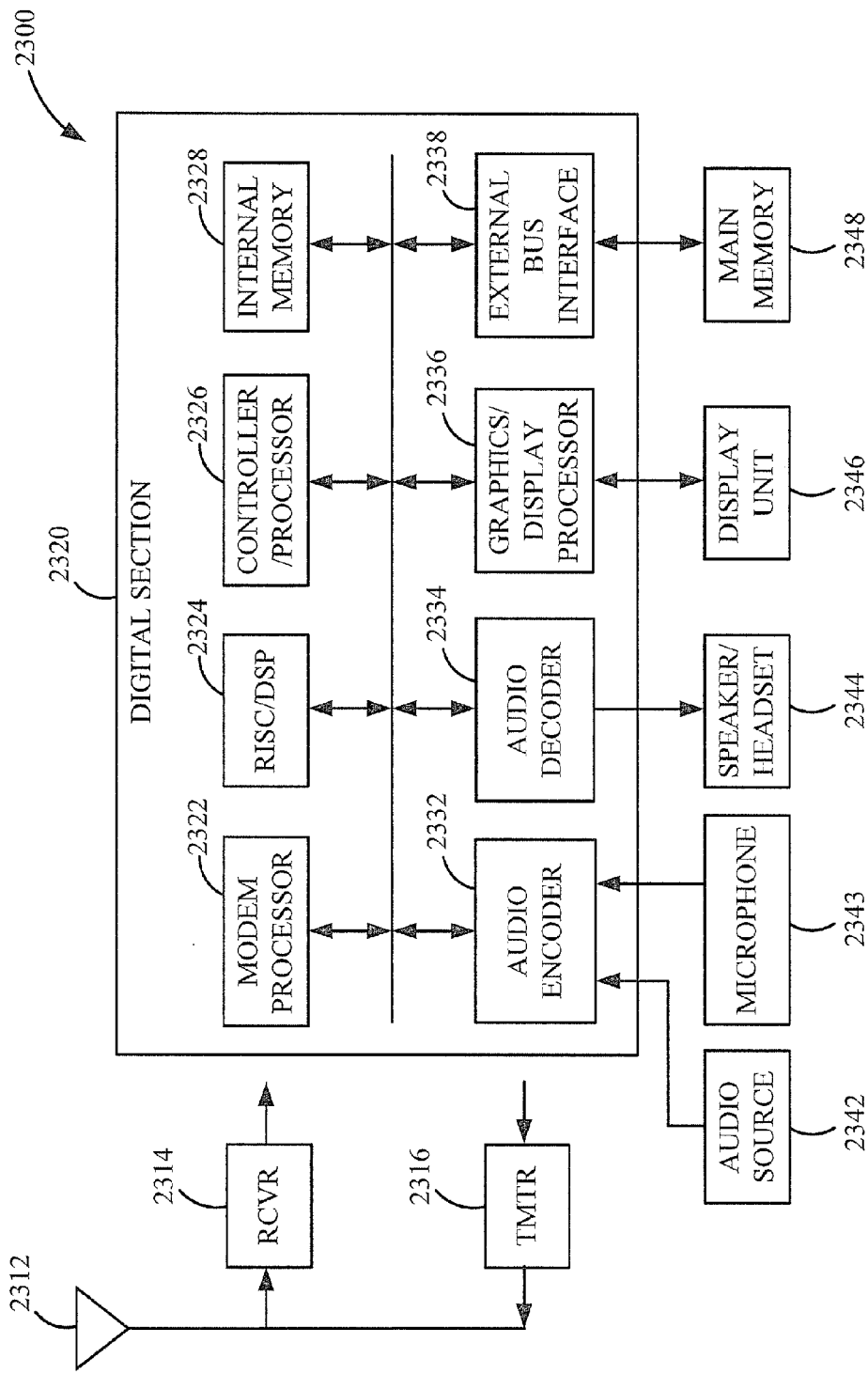
FIG. 23 shows a configuration of an exemplary mobile device in a wireless communications system.

FIG. 23 shows a configuration of an exemplary mobile device 2300 in a wireless communication system. The configuration of the mobile device 2300 may be implemented in the client devices 110 and 210. The mobile device 2300 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, Wideband CDMA (WCDMA) system, Long Tern Evolution (LTE) system, LTE Advanced system, etc. Further, the mobile device 2300 may communicate directly with another mobile device, e.g., using Wi-Fi Direct, Bluetooth, or FlashLinq technology.

The mobile device 2300 is capable of providing bidirectional communication via a receive path and a transmit path. On the receive path, signals transmitted by base stations are received by an antenna 2312 and are provided to a receiver (RCVR) 2314. The receiver 2314 conditions and digitizes the received signal and provides samples such as the conditioned and digitized digital signal to a digital section for further processing. On the transmit path, a transmitter (TMTR) 2316 receives data to be transmitted from a digital section 2320, processes and conditions the data, and generates a modulated signal, which is transmitted via the antenna 2312 to the base stations. The receiver 2314 and the transmitter 2316 may be part of a transceiver that may support CDMA, GSM, LTE, LTE Advanced, etc.

The digital section 2320 includes various processing, interface, and memory units such as, for example, a modem processor 2322, a reduced instruction set computer/digital signal processor (RISC/DSP) 2324, a controller/processor 2326, an internal memory 2328, a generalized audio encoder 2332, a generalized audio decoder 2334, a graphics/display processor 2336, and an external bus interface (EBI) 2338. The modem processor 2322 may perform processing for data transmission and reception, e.g., encoding, modulation, demodulation, and decoding. The RISC/DSP 2324 may perform general and specialized processing for the mobile device 2300. The controller/processor 2326 may perform the operation of various processing and interface units within the digital section 2320.

The internal memory 2328 may store data and/or instructions for various units within the digital section 2320.

The generalized audio encoder 2332 may perform encoding for input signals from an audio source 2342, a microphone 2343, etc. The generalized audio decoder 2334 may perform decoding for coded audio data and may provide output signals to a speaker/headset 2344. The graphics/display processor 2336 may perform processing for graphics, videos, images, and texts, which may be presented to a display unit 2346. The EBI 2338 may facilitate transfer of data between the digital section 2320 and a main memory 2348.

The digital section 2320 may be implemented with one or more processors, DSPs, microprocessors, RISCs, etc. The digital section 2320 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recognizing a set of characters in an object, the method comprising:
   receiving, at a client device, a plurality of images of an object, each image of the plurality of images including a text block;
   extracting a pattern associated with the object from a particular image of the plurality of images of the object;
   identifying a character format based on the extracted pattern;
   determining, at the client device, a boundary of the object based on the extracted pattern;
   identifying, at the client device, the text block in each image of the plurality of images of the object based on the boundary of the object; and
   determining, at the client device, a set of characters in the object based in part on the identified text blocks and based in part on the character format.

2. The method of claim 1, wherein determining the set of characters includes:
   for each image of the plurality of images of the object, generating an interim set of characters for the text block identified in the corresponding image of the plurality of images; and
   inferring the set of characters based on the interim sets of characters.

3. The method of claim 2, further comprising, for each interim set of characters, determining a confidence level based on a sharpness of the interim set of characters, wherein inferring the set of characters includes inferring the set of characters based in part on the confidence level of each interim set of characters.

4. The method of claim 2, wherein each interim set of characters includes characters at character positions, wherein a first character in the set of characters is inferred based on a number of occurrences of the first character at a first character position in each interim set of characters.

5. The method of claim 2, wherein a first character in the set of characters is inferred when a number of occurrences of the first character at a first character position in each interim set of characters exceeds a threshold value.

6. The method of claim 2, further comprising receiving format information at the client device from a server regarding the set of characters in the object, and wherein, for each image of the plurality of images of the object, generating the interim set of characters is further based on the received format information.

7. The method of claim 1, wherein determining the boundary of the object further comprises:
   detecting the boundary of the object in each image of the plurality of images of the object by determining boundary features, wherein the boundary features include a corner, an edge, or both; and
   verifying the boundary based on size information of the object, wherein the size information includes a length of the object, a width of the object, an aspect ratio of the object, or a combination thereof.

8. The method of claim 1, further comprising receiving another image of the plurality of images of the object at the client device if a detected boundary of the object in a particular image of the plurality of images is not verified based on size information of the object.

9. The method of claim 1, further comprising:
   identifying a type of the object based on the extracted pattern; and
   identifying a configuration of the object based on the type of the object.

10. The method of claim 1, wherein one or more of the plurality of images of the object include a video frame of the object.

11. The method of claim 1, wherein the client device is a cell phone, and further comprising displaying the set of characters on a display of the cell phone.

12. The method of claim 1, further comprising receiving configuration information at the client device from a server, wherein the configuration information comprises location information of the text block with respect to the boundary, wherein the text block in each image of the plurality of images is identified based further on the location information, and wherein each image of the plurality of images is captured at a different time.

13. The method of claim 1, further comprising:
   for each image of the plurality of images of the object, generating an interim set of characters for the text block identified in the image; and
   for each interim set of characters, determining a confidence level based on a sharpness of the interim set of characters, wherein determining the set of characters in the object is further based on the confidence level of each interim set of characters.

14. The method of claim 1, further comprising:
   for each image of the plurality of images of the object, generating an interim set of characters for the text block identified in the image; and
   for each interim set of characters, determining a confidence level based on a similarity value of the interim set of characters, wherein the similarity value indicates a similarity to reference characters, and wherein determining the set of characters in the object is further based on the confidence level of each interim set of characters.

15. The method of claim 1, wherein the boundary is determined further based on size information of the object, the size information determined based on the extracted pattern.

16. The method of claim 15, wherein identifying the text block in each image of the plurality of images of the object is based further on location information that indicates a location of the text block with respect to the boundary.

17. A device for recognizing a set of characters in an object, the device comprising:
   an image capturing unit configured to capture a plurality of images of an object, each image of the plurality of images including a text block;
   an object recognition unit configured to extract a pattern associated with the object from a particular image of the plurality of images of the object and configured to identify a character format based on the extracted pattern;
   a boundary detector configured to detect a boundary of the object based on the extracted pattern;
   a masking unit configured to identify the text block in each image of the plurality of images of the object based on the boundary of the object; and a temporal filter configured to determine a set of characters in the object based in part on the identified text blocks and based in part on the character format.

18. The device of claim 17, further comprising an optical character reader (OCR) engine configured to, for each image of the plurality of images of the object, generate an interim set of characters by performing optical character recognition on the text block identified in the corresponding image of the plurality of images of the object using the character format, wherein the character format identifies a number of characters in the set of characters and a type of each character in the set of characters.

19. The device of claim 18, wherein the temporal filter is further configured to infer the set of characters based on a confidence level of each interim set of characters.

20. The device of claim 19, wherein a first character in the set of characters is inferred based on a number of occurrences of the first character at a first character position in each interim set of characters.

21. The device of claim 20, wherein the first character in the set of characters is inferred when the number of occurrences of the first character exceeds a threshold value.

22. The device of claim 18, wherein the OCR engine is further configured to:
receive format information related to the set of characters in the object, wherein the format information includes the character format; and
for each image of the plurality of images of the object, generate the interim set of characters based on the format information.

23. The device of claim 17, wherein the boundary detector is further configured to detect the boundary of the object in each image of the plurality of images of the object based on edge detection and to verify the boundary detected in each image of the plurality of images based on size information of the object, wherein the masking unit is further configured to identify the text block in each image of the plurality of images of the object based on location information of the text block, and wherein the size information and the location information are determined based on the extracted pattern.

24. The device of claim 17, wherein the image capturing unit is further configured to receive another image of the plurality of images of the object if a detected boundary of the object in a particular image of the plurality of images is not verified based on size information of the object.

25. The device of claim 17, wherein the object recognition unit is further configured to identify a type of the object based on the extracted pattern and to identify a configuration of the object based on the type of the object.

26. The device of claim 25, wherein the configuration of the object indicates a layout of the object, a size of the object, location information of the text block with respect to the boundary, language information, or appearance information.

27. The device of claim 17, wherein the plurality of images of the object includes a sequence of images, and wherein the character format indicates a number of characters and an arrangement of the characters.

28. The device of claim 17, wherein the image capturing unit is configured to capture each image of the plurality of images at a different time, and wherein the temporal filter is configured to determine the set of characters using each interim set of characters.

29. The device of claim 17, wherein the object comprises a credit card, a driver's license, or a passport.

30. The device of claim 17, wherein the object recognition unit is further configured to compare the extracted pattern to stored patterns to determine a configuration associated with the object, the stored patterns accessible to the object recognition unit.

31. The device of claim 17, wherein the extracted pattern includes a logo or a set of features, and wherein the logo or the set of features are located outside of the text block in each image of the plurality of images of the object.

32. The device of claim 17, wherein the object includes a reference feature unique to the object, wherein the reference feature is located outside of the text block in each image of the plurality of images of the object, and wherein the extracted pattern corresponds to at least a portion of the reference feature.

33. The device of claim 17, further comprising a rectification unit configured to:
receive configuration information from a server;
receive the plurality of images from the boundary detector; and
rectify the plurality of images based on the configuration information and the boundary of the object to produce rectified images, wherein the rectified images are provided to the masking unit.

34. The device of claim 33, wherein the configuration information comprises coordinates of the text block with respect to the boundary, an aspect ratio of the object, a length of the object, a width of the object, or a combination thereof, and wherein the masking unit is further configured to identify the text block in each image of the plurality of images based further on the coordinates of the text block.

35. The device of claim 33, wherein the rectification unit is configured to rectify a particular image of the plurality of images by changing from an original value of an aspect ratio, a size, or an orientation of the particular image to a rectified value.

36. A non-transitory computer-readable medium comprising instructions for recognizing a set of characters in an object, the instructions causing a processor to perform operations comprising:
receiving a plurality of images of an object, each image of the plurality of images including a text block;
extracting a pattern associated with the object from a particular image of the plurality of images of the object;
identifying a character format based on the extracted pattern;
determining a boundary of the object based on the extracted pattern;
identifying the text block in each image of the plurality of images of the object based on the boundary of the object; and
determining a set of characters in the object based in part on the identified text blocks and based in part on the character format.

37. The non-transitory computer-readable medium of claim 36, wherein determining the set of characters includes:
for each identified text block, generating an interim set of characters by performing optical character recognition on the text block using the character format, wherein the character format identifies a number of characters in the set of characters and a type of each character in the set of characters; and
inferring the set of characters based on each interim set of characters.

38. The non-transitory computer-readable medium of claim 37, wherein the set of characters is inferred based on a confidence level of each interim set of characters.

39. The non-transitory computer-readable medium of claim 38, wherein a first character in the set of characters is inferred based on a number of occurrences of the first character at a first character position in each interim set of characters.

40. The non-transitory computer-readable medium of claim 39, wherein the first character in the set of characters is inferred when the number of occurrences of the first character exceeds a threshold value.

41. The non-transitory computer-readable medium of claim 37, wherein generating the interim set of characters includes:
    receiving format information regarding the set of characters in the object, wherein the format information includes the character format; and
    for each image of the plurality of images of the object, generating the interim set of characters based on the format information.

42. The non-transitory computer-readable medium of claim 36, wherein the operations further comprise verifying the boundary determined in each image of the plurality of images based on size information of the object.

43. The non-transitory computer-readable medium of claim 36, wherein the operations further comprise determining a type of the object based on the extracted pattern.

44. An apparatus for recognizing a set of characters in an object, the apparatus comprising:
    means for capturing a plurality of images of an object, each image of the plurality of images including a text block;
    means for extracting a pattern associated with the object from a particular image of the plurality of images of the object and for identifying a character format based on the extracted pattern;
    means for determining a boundary of the object based on the extracted pattern;
    means for identifying the text block in each image of the plurality of images of the object based on the boundary of the object; and
    means for determining a set of characters in the object based in part on the identified text blocks and based in part on the character format.

45. The apparatus of claim 44, further comprising means for generating, for each image of the plurality of images, an interim set of characters for the text block identified in the corresponding image of the plurality of images of the object, wherein the means for determining the set of characters is further configured to infer the set of characters based on each interim set of characters.

46. The apparatus of claim 45, wherein a first character in the set of characters is inferred based on a number of occurrences of the first character at a first character position in each interim set of characters.

47. The apparatus of claim 45, wherein a first character in the set of characters is inferred when a number of occurrences of the first character at a first character position in each interim set of characters exceeds a threshold value.

48. The apparatus of claim 44, further comprising means for verifying the boundary determined in each image of the plurality of images based on size information of the object.

* * * * *